United States Patent
Son et al.

(10) Patent No.: US 9,922,452 B2
(45) Date of Patent: Mar. 20, 2018

(54) APPARATUS AND METHOD FOR ADJUSTING BRIGHTNESS OF IMAGE

(71) Applicant: Samsung Electronics Co., Ltd., Suwon-si (KR)

(72) Inventors: Minjung Son, Suwon-si (KR); Heesae Lee, Yongin-si (KR); Donghoon Sagong, Suwon-si (KR); KeeChang Lee, Seongnam-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/250,980

(22) Filed: Aug. 30, 2016

(65) Prior Publication Data

US 2017/0084068 A1 Mar. 23, 2017

(30) Foreign Application Priority Data

Sep. 17, 2015 (KR) .................. 10-2015-0131387
Dec. 9, 2015 (KR) .................. 10-2015-0174649

(51) Int. Cl.

| G06T 15/60 | (2006.01) |
|---|---|
| G06T 15/50 | (2011.01) |
| G06T 15/80 | (2011.01) |
| G06K 9/00 | (2006.01) |

(52) U.S. Cl.
CPC ........ *G06T 15/506* (2013.01); *G06K 9/00208* (2013.01); *G06T 15/50* (2013.01); *G06T 15/60* (2013.01); *G06T 15/80* (2013.01); *G06K 9/00268* (2013.01)

(58) Field of Classification Search
None
See application file for complete search history.

(56) References Cited

U.S. PATENT DOCUMENTS

| 6,980,697 B1 | 12/2005 | Basso et al. |
| 7,844,076 B2 | 11/2010 | Corcoran et al. |
| 8,315,461 B2 | 11/2012 | Free |
| 8,447,098 B1 * | 5/2013 | Cohen .................. G06T 7/0075 382/154 |
| 8,855,422 B2 | 10/2014 | Free |

(Continued)

FOREIGN PATENT DOCUMENTS

| JP | 2010-508571 A | 3/2010 |
| KR | 10-1310040 B1 | 9/2013 |
| KR | 10-1446975 B1 | 10/2014 |

OTHER PUBLICATIONS

Z. Wen et al., "Face Relighting With Radiance Environment Maps." *Proceedings 2003 IEEE Computer Society Conference on Computer Vision and Pattern Recognition*, vol. 2, 2003, pp. 0-11.

(Continued)

*Primary Examiner* — Ryan D McCulley
(74) *Attorney, Agent, or Firm* — NSIP Law

(57) ABSTRACT

A method of adjusting a brightness of an image includes matching an object model to an object based on one or more feature points of the object extracted from an input image including the object; mapping a surface normal map in a two-dimensional (2D) image form to the input image based on the matched object model; and generating shadow information for the input image based on the mapped surface normal map and a virtual light source.

21 Claims, 21 Drawing Sheets

(56) References Cited

U.S. PATENT DOCUMENTS

| | | | |
|---|---|---|---|
| 2007/0098254 A1* | 5/2007 | Yang | G06K 9/00369 |
| | | | 382/159 |
| 2007/0110305 A1 | 5/2007 | Corcoran et al. | |
| 2009/0226049 A1 | 9/2009 | Debevec et al. | |
| 2009/0267942 A1* | 10/2009 | Endo | A63F 13/10 |
| | | | 345/426 |
| 2009/0310828 A1 | 12/2009 | Kakadiaris et al. | |
| 2010/0026831 A1 | 2/2010 | Ciuc et al. | |
| 2011/0182520 A1 | 7/2011 | Free | |
| 2013/0127860 A1* | 5/2013 | Hadap | G06T 7/507 |
| | | | 345/426 |
| 2015/0043806 A1* | 2/2015 | Karsch | G06T 7/0061 |
| | | | 382/154 |
| 2015/0332512 A1* | 11/2015 | Siddiqui | G06T 15/80 |
| | | | 345/633 |
| 2016/0127630 A1* | 5/2016 | Kitajima | G06T 5/008 |
| | | | 348/370 |
| 2016/0150143 A1* | 5/2016 | Matthews | H04N 5/23229 |
| | | | 348/135 |
| 2016/0210722 A1* | 7/2016 | Fortin | G06T 15/005 |
| 2016/0269705 A1* | 9/2016 | Tajima | H04N 9/74 |
| 2016/0307324 A1* | 10/2016 | Nakada | G06T 7/0042 |
| 2016/0314619 A1* | 10/2016 | Luo | G06T 17/20 |

OTHER PUBLICATIONS

M. Okabe et al., "Single-View Relighting With Normal Map Painting." *Proc. Pacific Graphics*, Oct. 2006, (8 pages in English).

T. Weyrich et al., "Analysis of Human Faces Using a Measurement-Based Skin Reflectance Model." *ACM Transactions on Graphics (TOG)*. vol. 25. No. 3. ACM, Jul. 2006, (12 pages in English).

M. Song et al., "Image Ratio Features for Facial Expression Recognition Application." *IEEE Transactions on Systems, Man, and Cybernetics, Part B: Cybernetics*, 40.3, Jun. 2010, pp. 779-788.

X. Li et al., "A Remarkable Standard for Estimating the Performance of 3D Facial Expression Features." *Neurocomputing* 82, Apr. 2012, pp. 99-108.

S. Happy et al., "Automatic Facial Expression Recognition Using Features of Salient Facial Patches." *IEEE Transactions on Affective Computing* 6.1, Jan. 2015, pp. 1-13.

Marschner, Stephen R et al., "Inverse Lighting for Photography," *Proceedings of IS&T/SID Fifth Color and Imaging Conference*, Nov. 1997, pp. 262-265.

Wikipedia, "Normal Mapping," Retrieved from internet: https://en.wikipedia.org/w/index.php?title=Normal_mapping&oldid=659896166, retrieved Jan. 20, 2017, edited Apr. 29, 2015 (4 Pages in English).

European Search Report issued on Feb. 2, 2017 in corresponding European Application No. 16187083.7 (9 pages in English).

* cited by examiner

APPARATUS AND METHOD FOR ADJUSTING BRIGHTNESS OF IMAGE

CROSS-REFERENCE TO RELATED APPLICATIONS

This application claims the benefit under 35 USC 119(a) of Korean Patent Application Nos. 10-2015-0131387 filed on Sep. 17, 2015, and 10-2015-0174649 filed on Dec. 9, 2015, in the Korean Intellectual Property Office, the entire disclosures of which are incorporated herein by reference for all purposes.

BACKGROUND

1. Field

The following description relates to technology for adjusting a brightness of an image.

2. Description of Related Art

A smart device such as a smartphone is widely used, and the smart device generally includes a camera to enable a user to produce contents. The smart device may capture an image or a video through the embedded camera. In addition, the smart device may display the captured image or play the video.

Further, the smart device may provide a user with an image edit function. For example, the user may change a color or a size of an image captured by the smart device in accordance with a preference of the user. The smart device may provide a user with an edit function through which the user may more conveniently edit an image to make the image appear more natural.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of adjusting a brightness of an image includes matching an object model to an object based on one or more feature points of the object extracted from an input image including the object; mapping a surface normal map to the input image based on the matched object model; and generating shadow information for the input image based on the mapped surface normal map and a virtual light source.

The mapping of the surface normal map to the input image may include generating the surface normal map in a two-dimensional (2D) image form by interpolating normal vectors at points at which the feature points of the matched object model are located.

The mapping of the surface normal map to the input image may include generating the surface normal map in a two-dimensional (2D) image form by transforming a surface normal model prestored in a database in association with the object model into the surface normal map.

The matching of the object model to the object may include determining a transformation function to transform coordinates of feature points of the object model to coordinates of the feature points of the object.

The mapping of the surface normal map to the input image may include generating a transformed normal map in a two-dimensional (2D) image form by transforming each coordinate of a surface normal model using the determined transformation function.

The generating of the shadow information may include performing a dot product calculation between a normal vector at each coordinate of the surface normal map and a light vector of the virtual light source at a corresponding coordinate of the input image, and the performing of the dot product calculation may include determining the light vector at the corresponding coordinate of the input image based on either a relationship between a location of the virtual light source and the corresponding coordinate of the input image, or an illumination direction of the virtual light source.

The method may further include generating a relighted image by applying the shadow information to the input image; and adjusting a tone of the relighted image based on a brightness histogram of the input image; and the adjusting of the tone of the relighted image may include adding a weight to a tone of a pixel in at least a portion of the relighted image based on a ratio of a number of pixels in a preset brightness range in the input image to a total number of pixels in the input image.

The method may further include receiving a control signal indicating any one or any combination of an intensity, a location, a color, an illumination direction, and a type of the virtual light source; and the object may be a human face.

In another general aspect, a non-transitory computer-readable storage medium stores instructions that, when executed by a processor, cause the processor to perform the method described above.

In another general aspect, an apparatus for adjusting a brightness of an image includes a processor configured to match an object model to an object based on one or more feature points of the object extracted from an input image including the object, map a surface normal map to the input image based on the matched object model, and generate shadow information for the input image based on the mapped surface normal map and a virtual light source.

The processor may be further configured to generate the surface normal map in a two-dimensional (2D) image form by interpolating normal vectors at points at which the feature points of the matched object model are located.

The apparatus may further include a memory configured to prestore a surface normal model in a database in association with the object model; and the processor may be further configured to generate the surface normal map in a two-dimensional (2D) image form by transforming the surface normal model into the surface normal map.

The processor may be further configured to determine a transformation function to transform coordinates of feature points of the object model to coordinates of the feature points of the object.

The processor may be further configured to generate a transformed normal map in a two-dimensional (2D) image form by transforming each coordinate of a surface normal model using the determined transformation function.

The processor may be further configured to perform a dot product calculation between a normal vector at each coordinate of the surface normal map and a light vector of the virtual light source at a corresponding coordinate of the input image, and determine the light vector at the corresponding coordinate of the input image based on either a relationship between a location of the virtual light source and the corresponding coordinate of the input image, or an illumination direction of the virtual light source.

The processor may be further configured to generate a relighted image by applying the shadow information to the input image, and adjust a tone of the relighted image based on a brightness histogram of the input image, and add a weight to a tone of a pixel in at least a portion of the relighted image based on a ratio of a number of pixels in a preset brightness range in the input image to a total number of pixels in the input image.

In another general aspect, an apparatus includes an image receiver configured to receive an input image including an object; and a processor configured to match an object model to the object based on one or more feature points of the object extracted from the input image, map a surface normal map o the input image based on the matched object model, and generate shadow information for the input image based on the mapped surface normal map and a virtual light source.

The image receiver may be a camera; the processor may be further configured to apply the shadow information to the input image; and the apparatus may further include a display configured to display the input image to which the shadow information is applied.

The processor may be further configured to generate the surface normal map in a two-dimensional (2D) image form by interpolating normal vectors at points at which the feature points of the matched object model are located.

The apparatus may further include a memory configured to prestore in a database a surface normal model associated with the object model; and the processor may be further configured to generate the surface normal map in a two-dimensional (2D) image form by transforming the surface normal model into the surface normal map.

The processor may be further configured to generate the shadow information based on a view vector indicating a direction in which a user views the object and a reflection vector indicating a direction in which light projected from the virtual light source onto the object is reflected by the object.

In another general aspect, a method of adjusting a brightness of an image includes generating a surface normal map of an input image based on feature points of an object in the image and an object model; generating shadow information for the input image based on the surface normal map and a virtual light source; and applying the shadow information to the input image to adjust a brightness of the input image.

The object model may include feature points corresponding to the feature points of the object, and normal vectors corresponding to the feature points of the object model; and the generating of the surface normal map may include interpolating the normal vectors of the object model to obtain normal vectors at coordinates of the input image.

The generating of the surface normal map may include transforming a surface normal model to the surface normal map based on the feature points of the object and the object model.

The method may further include matching the object model to the object based on the feature points of the object and feature points of the object model; and the generating of the surface normal map may include generating the surface normal map by combining results of matching a plurality of surface normal models corresponding to views of the object from different directions to the feature points of the object model matched to the object.

The generating of the shadow information may include calculating, as the shadow information, a dot product between a normal vector at each coordinate of the surface normal map and a light vector of the virtual light source at a corresponding coordinate of the input image.

The generating of the shadow information may include calculating, as the shadow information, a dot product between a view vector indicating a direction in which a user views the object and a reflection vector at each coordinate of the input image indicating a direction in which light projected from the virtual light source onto the object is reflected by the object.

The generating of the shadow information may further include calculating the reflection vector based on the surface normal map and the virtual light vector.

The applying of the shadow information to the input image may generate a relighted image; and the method may further include adjusting a tone of the relighted image based on a brightness histogram of the input image.

The adjusting of the tone of the relighted image may include selecting a tone adjusting style from a plurality of tone adjusting styles based on the brightness histogram of the input image; and applying the selected tone adjusting style to the relighted image to adjust the tone of the relighted image.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
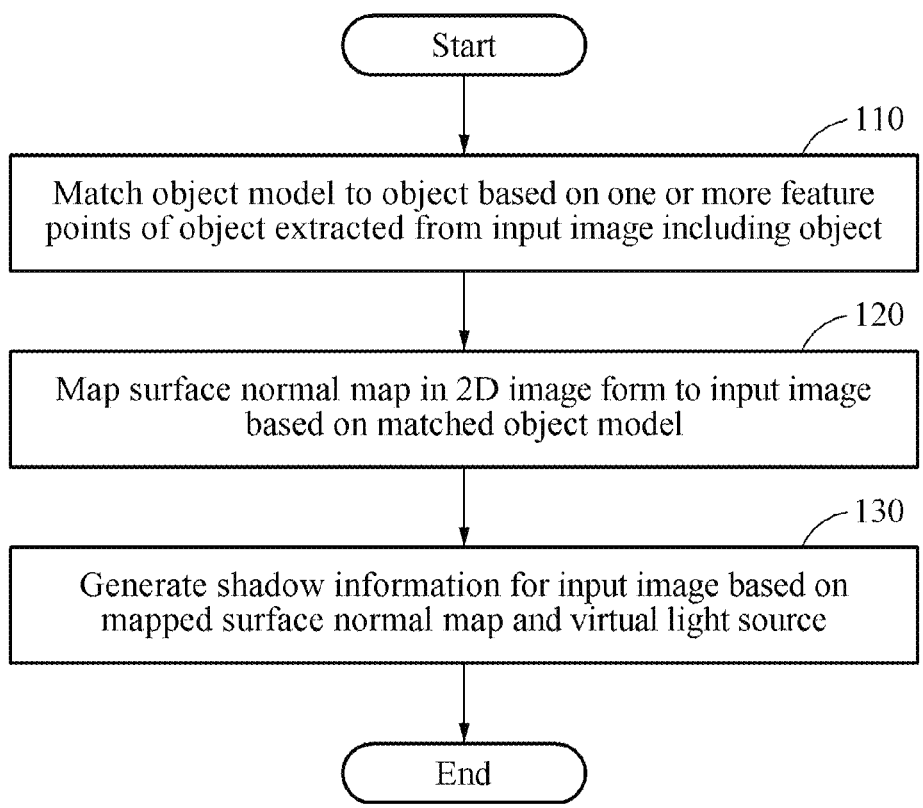
FIG. 1 is a flowchart illustrating an example of a method of adjusting a brightness of an image.

FIG. 1 is a flowchart illustrating an example of a method of adjusting a brightness of an image. Hereinafter, the method of adjusting a brightness of an image will be simply referred to as an image brightness adjusting method.

Referring to FIG. 1, in operation 110, a processor of an apparatus for adjusting a brightness of an image, hereinafter simply referred to as an image brightness adjusting apparatus, matches an object model to an object based on one or more feature points of the object extracted from an input image including the object. For example, the processor matches the object model to the object in the input image by matching coordinates of each feature point of the object model to coordinates of a corresponding feature point of the object in the input image. Even though all feature points assigned to a general form of the object may not be extracted, the processor may match the object model to the object in the input image when a preset feature point is extracted or a preset number of feature points are extracted. An input image is an image in which the object appears, and may be an image in a two-dimensional (2D) form. For example, the input image may be a still image or an individual frame of a video.

An object is an object appearing in the input image and distinguished from a background in the input image. The object may be of various types, including, for example, a human face, a human body, an animal, and other things. A feature point is a point assigned to a feature of the object. For example, feature points of an object that is a human face, may be assigned to, for example, eyes, a nose, and lips.

The object model is a generic model to which feature points are preassigned for an object of a certain type. For example, the object model may be defined by feature points located at coordinates in an image of a present size, for example, a same size as the input image. The object model may be a model in a 2D image form or in a three-dimensional (3D) image form including a general form of the object of a certain type, for example, an outline of the object and a geometry of feature points of the object, and including locations at which the feature points are located in such a general form. In a case of the object model being in the 3D image form, the processor may match the object model to a 2D input image.

In one example, the processor matches an outline of the object model to an outline of the object. Although the object is described as a human face hereinafter, the object is not limited to a human face, and thus the details described herein are also applicable to other types of objects. For example, in a case of an animal head, an object model having feature points and a general form of the animal head may be used.

Figure 10:
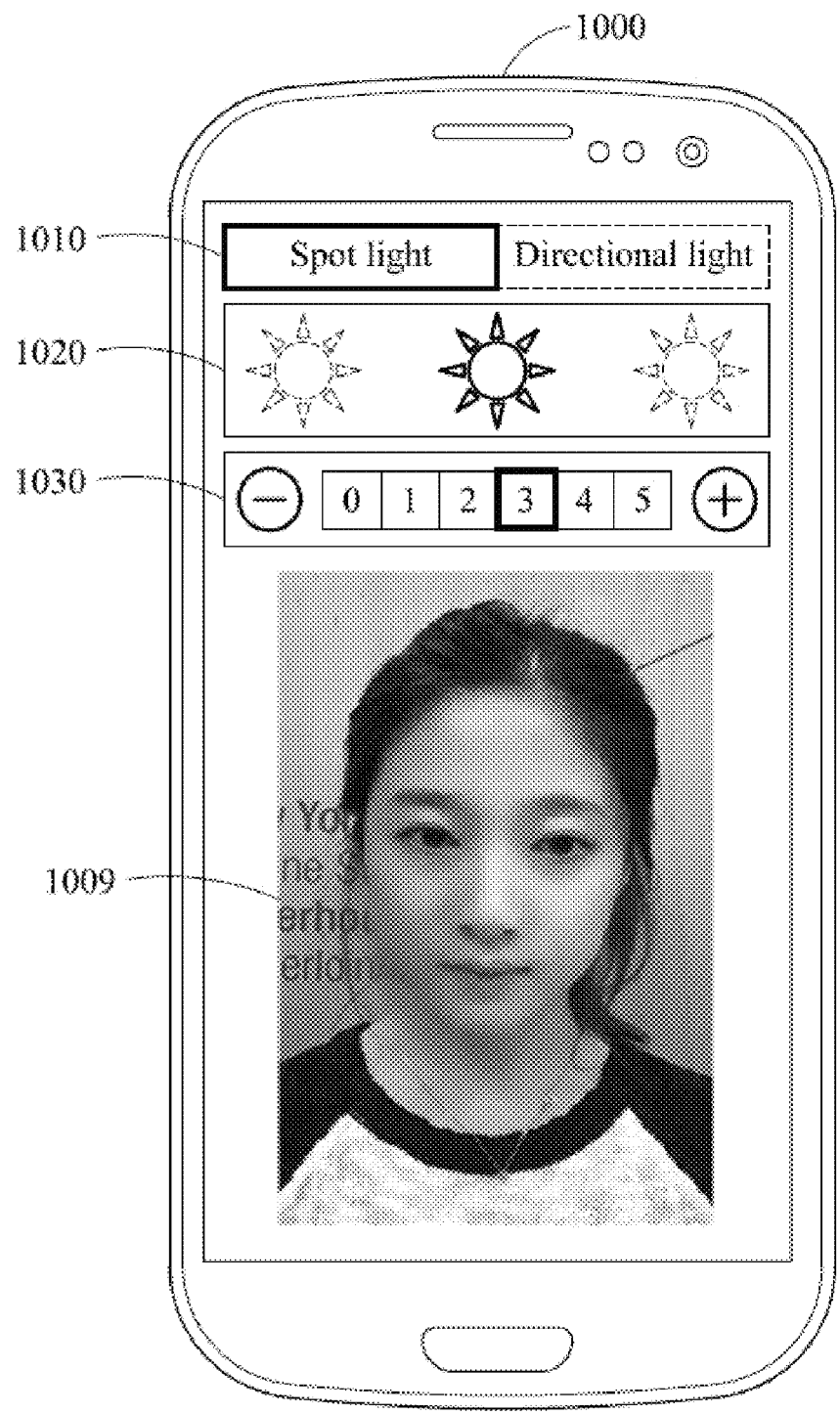
FIG. 10 illustrates an example of a graphical user interface (GUI) of an apparatus for adjusting a brightness of an image.

In one example, the processor applies an existing face outline extracting algorithm to an input image including a human face for accurate matching. In another example, in a case in which a real-time operation is preferred, the processor assumes the face to be an oval, that is, a figure corresponding to an approximate contour of an object based on a type of the object, and modifies the oval based on a proportion of each feature point of the object. The face outline extracting algorithm necessitates an additional calculation time, so the processor applies the foregoing process of assuming the face to be an oval and modifying the oval in a real-time preview mode, for example, a mode in which a preview is provided to a user without storing an image in a memory as illustrated in FIG. 10, and increases accuracy by applying the face outline extracting algorithm when storing a relighted image, for example, when storing a relighted image by the user clicking a capture button. By accurately matching face outlines, an error that occurs at a boundary between a face outline and a background is reduced when applying a shadow effect.

In operation 120, the processor maps a surface normal map in a 2D image form to the input image based on the matched object model. The mapping of the surface normal map will be described in detail hereinafter.

The surface normal map is a map to which a normal vector of a surface of the object is mapped with respect to coordinates of each pixel of the input image. A normal vector mapped to a pixel of the object in the input image has a vector value on a normal of the surface of the object at the pixel. In one example, the surface normal map is provided in the 2D image form, and a normal vector is mapped to each of 2D coordinates. For an input image having a resolution of m×n, where n and m are integers greater than or equal to 1, the map to which the normal vector is mapped in the input image may be represented by Equation 1 below.

$$\begin{bmatrix} w_{11}, u_{11}, v_{11} & \ldots & w_{n1}, u_{n1}, v_{n1} \\ \ldots & \ldots & \ldots \\ w_{1m}, u_{1m}, v_{1m} & \ldots & w_{nm}, u_{nm}, v_{nm} \end{bmatrix} \quad (1)$$

In Equation 1, a normal vector to be mapped to coordinates of each pixel of the input image is expressed as a 3D vector $(w_{xy}, u_{xy}, v_{xy})$. $w_{xy}$ denotes an x direction component of a normal vector corresponding to a pixel at a location (x, y), $u_{xy}$ denotes a y direction component of the normal vector corresponding to the pixel at the location (x, y), and $v_{xy}$ denotes a z direction component of the normal vector corresponding to the pixel at the location (x, y). x is an integer greater than or equal to 1 and less than or equal to n, and y is an integer greater than or equal to 1 and less than or equal to m. For example, the x direction component, the y direction component, and the z direction component may be expressed as a red value, a green value, and a blue (RGB) value, respectively. However, a coordinate system used herein is not limited to an orthogonal coordinate system, and thus various coordinate systems may be used. Also, although the normal vector is expressed as an RGB value herein, the normal vector is not limited thereto, and thus the normal vector may be expressed using various color systems, for example, a YCbCr color value.

In operation 130, the processor generates shadow information for the input image based on the mapped surface normal map and a virtual light source. For example, the processor generates the shadow information indicating a shadow effect when light from the virtual light source is projected onto the object. In one example, the processor generates the shadow information by performing a dot product calculation between a normal vector at each coordinate of the surface normal map and a light vector of the virtual light source at a corresponding coordinate of the input image. The processor determines the light vector of the virtual light source based on a relationship between a location of the virtual light source and a location of each feature point in the input image. A process of calculating the light vector and performing a dot product calculation will be described in detail with reference to FIGS. 6A and 6B.

The shadow effect is an effect through which at least a portion of the input image is brightened or darkened. The shadow information is information indicating a degree by which a pixel of the input image is brightened or darkened.

Figure 2:
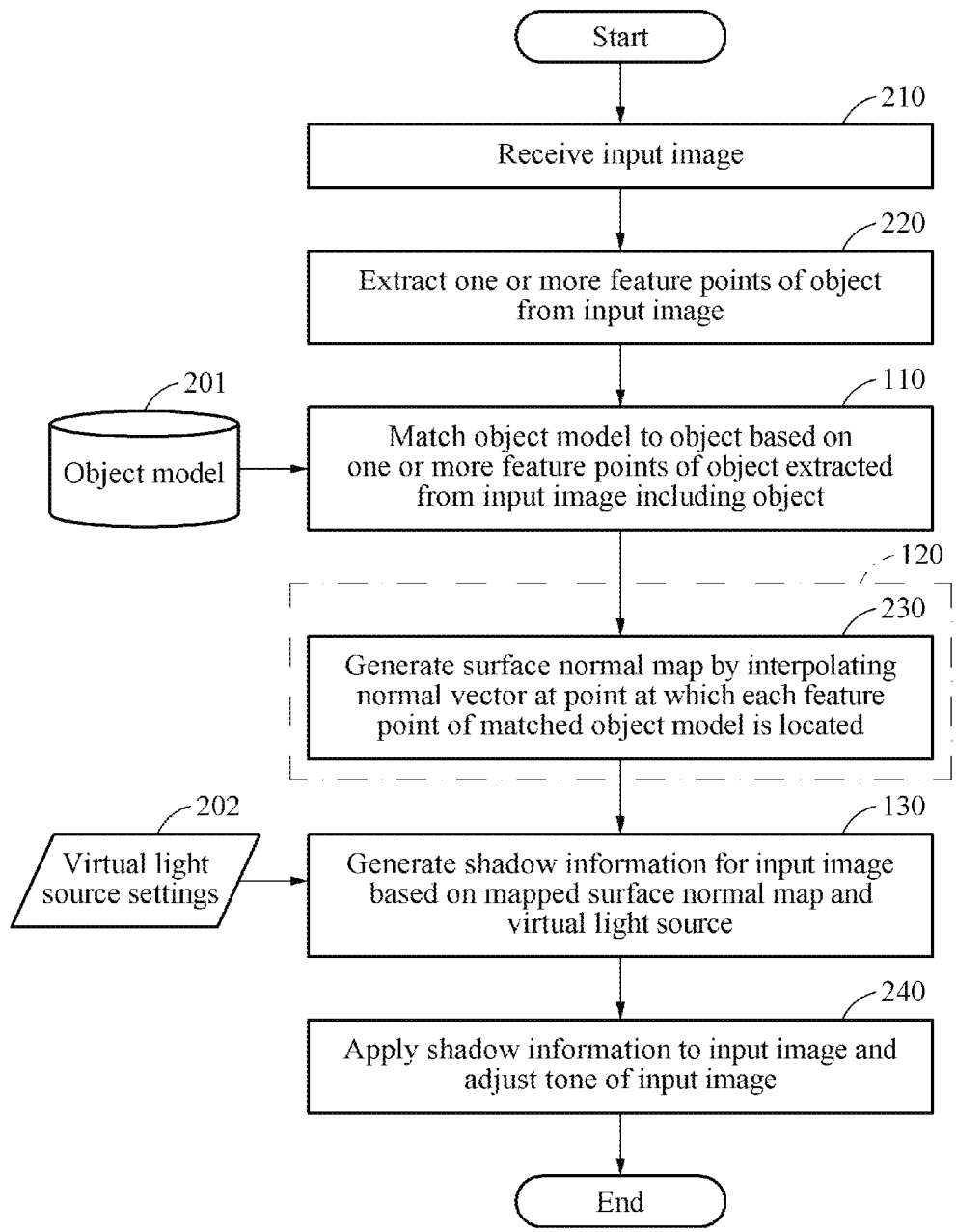
FIGS. 2 and 3 illustrate a detailed example of a method of adjusting a brightness of an image.
Figure 3:
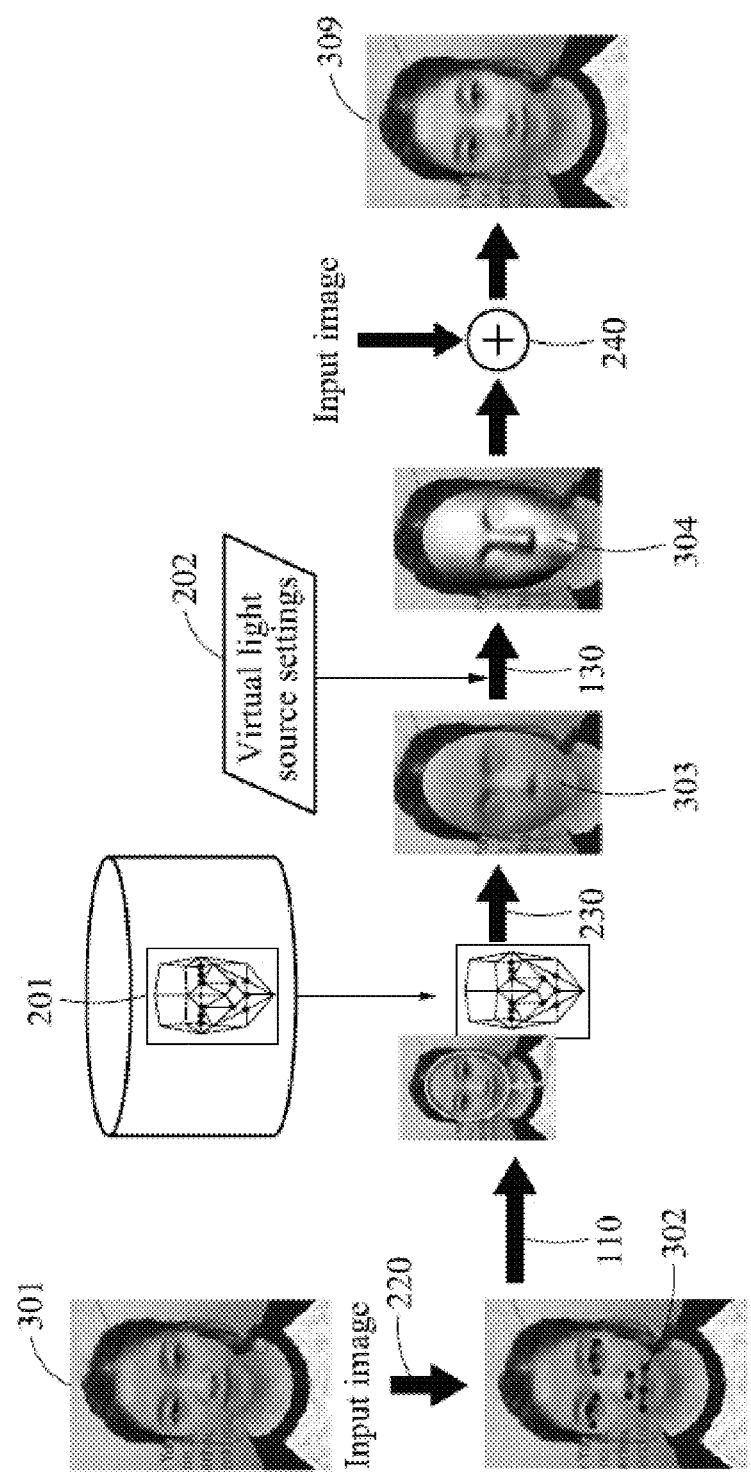

FIGS. 2 and 3 illustrate a detailed example of an image brightness adjusting method.

FIG. 2 is a flowchart illustrating a detailed example of the image brightness adjusting method using a surface normal map generated by interpolating an object model in which a normal vector is allocated to each feature point, and FIG. 3 illustrates a process of performing the image brightness adjusting method described with reference to FIG. 2.

Referring to FIGS. 2 and 3, in operation 210, an image receiver of an image brightness adjusting apparatus receives an input image 301. In one example, the image receiver is a camera, and the camera captures the input image 301. In another example, the image receiver is a communicator, and the communicator receives the input image 301 from an external source through wired or wireless communication.

In operation 220, a processor of the image brightness adjusting apparatus extracts one or more feature points 302 of an object in the input image 301. The processor extracts the feature points 302 of the object through a method specialized for a type of the object. For example, in a case of the object being a human face, the processor may extract the feature point 302 using an algorithm for extracting feature points, for example, a principal component analysis (PCA) or a linear discriminant analysis (LDA), to extract the feature points 302 of the human face. For example, as illustrated in FIG. 3, the processor extracts from the human face feature points 302 corresponding to eyes, a nose, and lips. The processor extracts at least a portion of all feature points set for a general form of the object. However, the algorithm for extracting feature points is not limited to the foregoing algorithms, and the feature points 302 are provided as an example and are not limited to the eyes, the nose, and the lips.

In operation 110, as described with reference to FIG. 1, the processor matches an object model 201 to the object. As illustrated in FIG. 3, the object model 201 may be prestored in a database.

In one example, the processor determines a transformation function to match the object model 201 to the object. The transformation function is a function used to transform coordinates of a feature point of the object model 201 to coordinates of the feature point 302 of the object in the input image 301, and defines a relationship between the coordinates of the feature point of the object model 201 and the coordinates of the feature point 302 of the object in the input image 301.

In operation 120, as described with reference to FIG. 1, the processor maps a surface normal map 303 to the input image 301. In detail, in operation 230, the processor generates the surface normal map 303 by interpolating normal vectors at points at which the feature points of the matched object model 201 are located. For example, in the object model 201, normal vectors are assigned only to the feature points, and the processor interpolates the normal vectors assigned to the feature points to obtain normal vectors for points between feature points. Thus, the processor generates, in real time, the surface normal map 303 adapted to the object. A quality of the surface normal map 303 is determined by an accuracy of the geometry of the object model 201.

In operation 130, as described with reference to FIG. 1, the processor generates shadow information 304. The processor sets a virtual light source based on virtual light source settings 202. The virtual light source settings 202 indicates a control signal to set any one or any combination of any two or more of an intensity, a location, a color, an illumination direction, and a type of the virtual light source, and may be either set by a user or set automatically. The shadow information 304 includes information about a weight indicating a degree by which brightness is to increased or decreased at each coordinate of the object. For example, as illustrated in FIG. 3, the shadow information 304 includes a bright region indicating a region having a weight causing a brightness to increase and a dark region indicating a region having a weight causing the brightness to decrease.

In one example, the processor generates the shadow information 304 for a face in the input image 301 based on the surface normal map 303 aligned based on a feature point of the face in the input image 301 and on the direction, the location, the intensity, and the type of the virtual light source set by the user. In one example, the processor calculates the shadow information 304 of each pixel of a face region by performing a dot product calculation between a normal vector allocated to the surface normal map 303 with respect to each pixel in the face region and a light vector assigned to the pixel.

In operation 240, the processor applies the shadow information 304 to the input image 301 to adjust a tone of the input image 301. For example, the processor generates a relighted image 309 by applying the shadow information 304 to the input image 301. The processor may adjust a tone of the relighted image 309 based on a brightness histogram of the input image 301. In one example, the processor adds a weight to a tone of a pixel corresponding to at least a portion of the relighted image 309 based on a ratio of a number of pixels in a preset brightness range of the input image 301 to a total number of pixels of the input image 301.

In one example, the processor updates the shadow information 304 for each pixel in the face region to final shadow information based on a tone adjustment style to be set by the user or set automatically. The processor expresses a shadow effect in the face region by applying the final shadow information to the input image 301. In addition, when adjusting the tone of the input image 301 and the relighted image 309, the processor may apply a blur effect to a boundary region between the object and a background to minimize an inconsistency in an outline area of the object, for example, the face.

Figure 4:
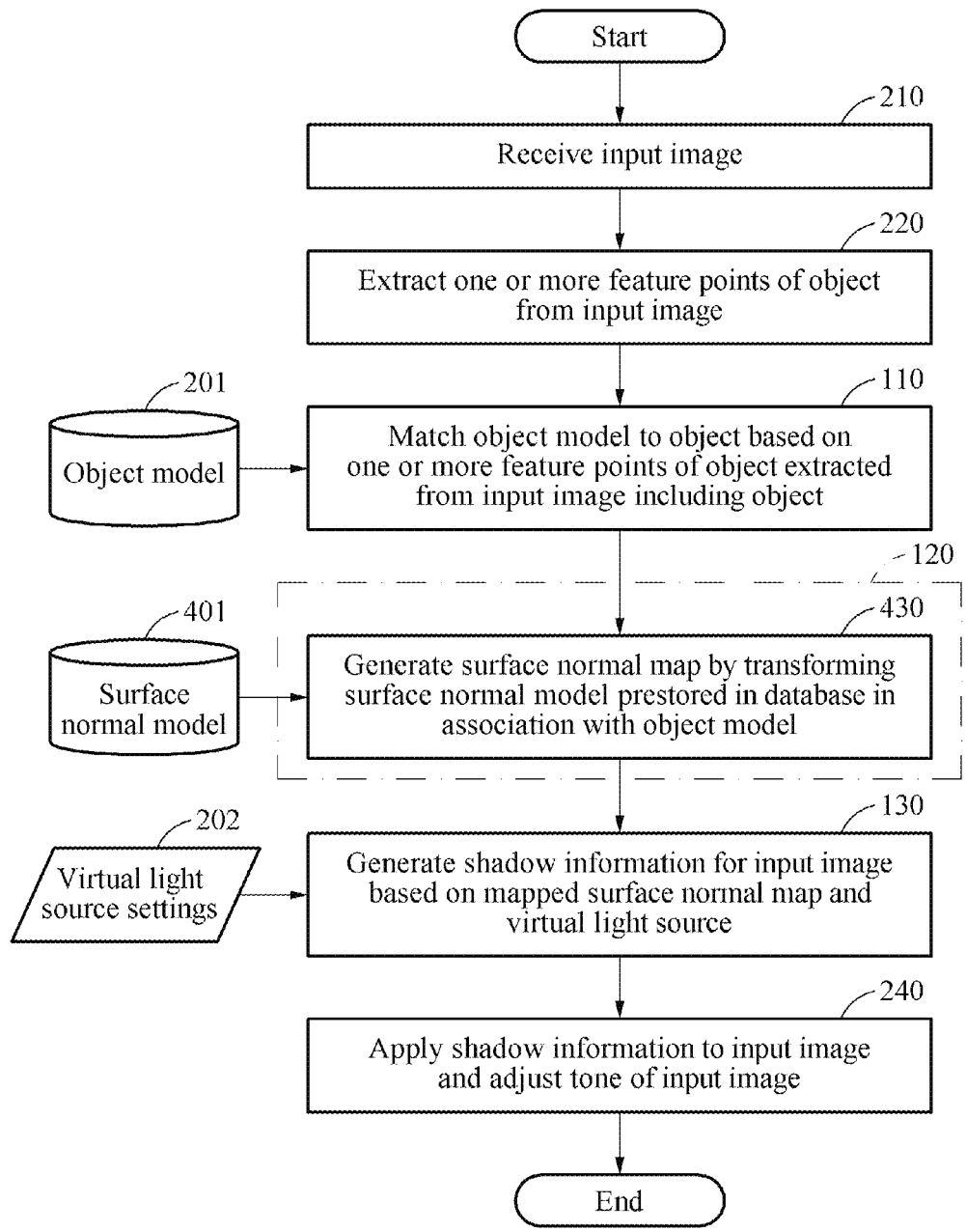
FIGS. 4, 5A, and 5B illustrate another detailed example of a method of adjusting a brightness of an image.
Figure 5A:
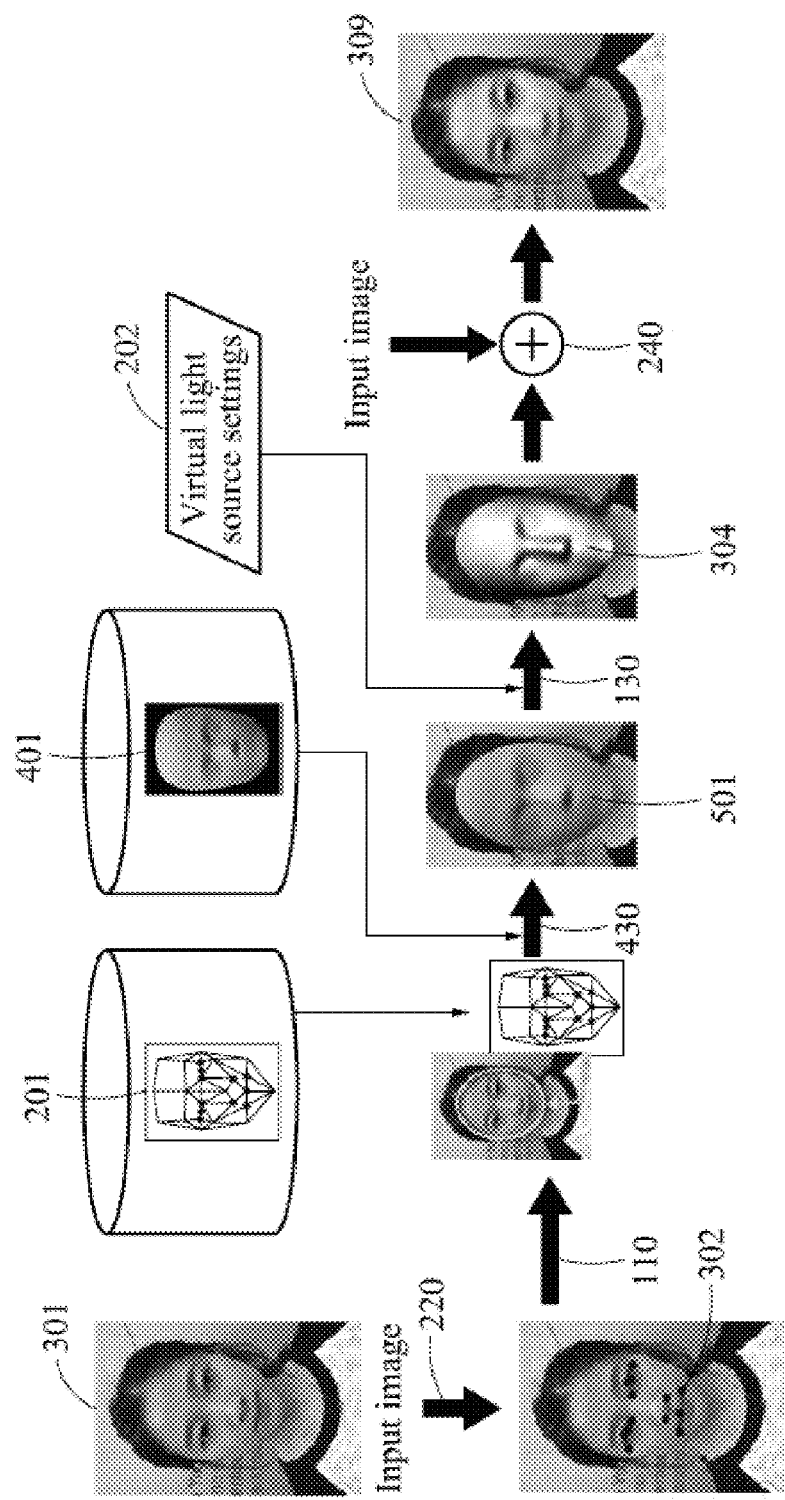
Figure 5B:
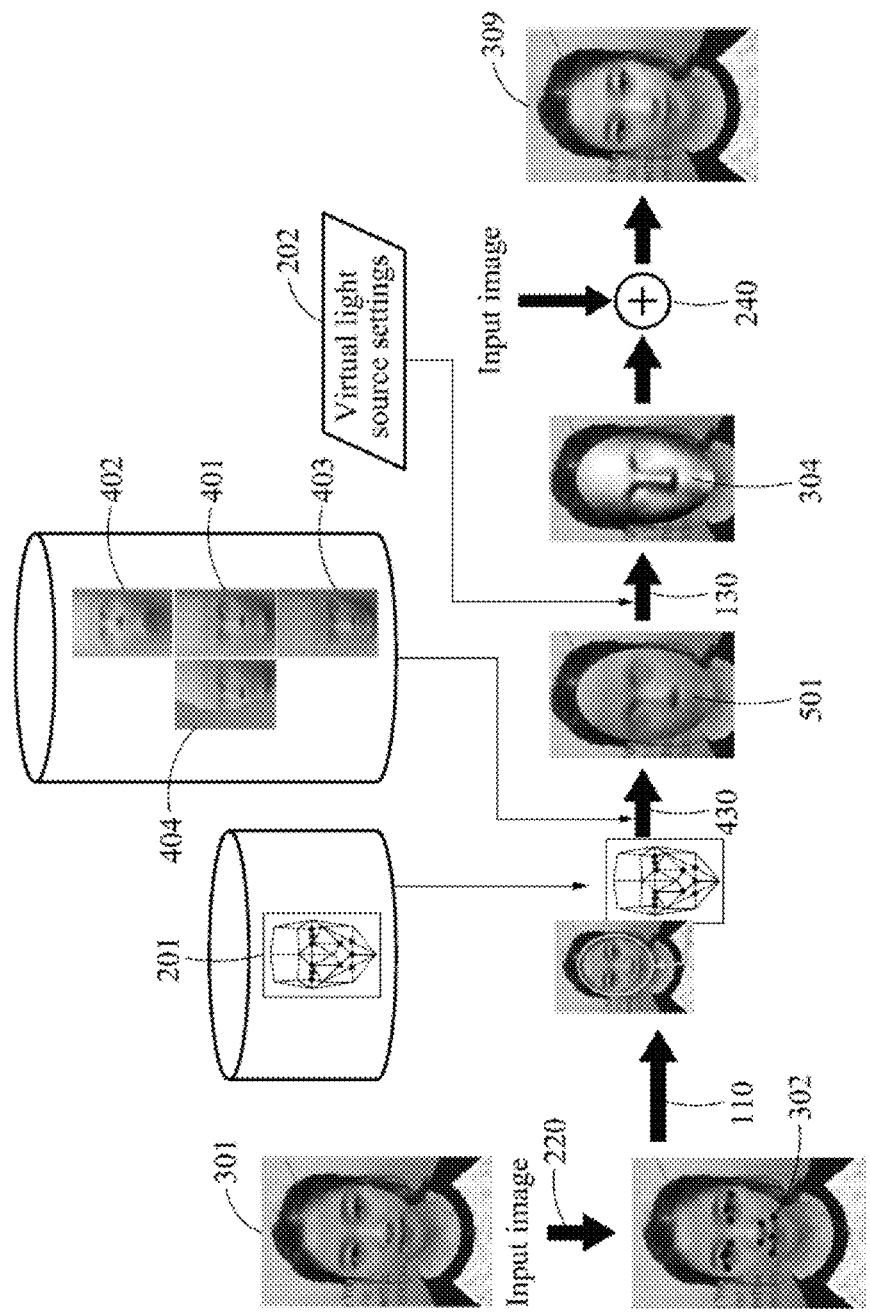

FIGS. 4, 5A, and 5B illustrate another detailed example of an image brightness adjusting method.

FIG. 4 is a flowchart illustrating another detailed example of the image brightness adjusting method using a prestored object model 201 and a surface normal model 401 stored in association with the object model 201, and FIGS. 5A and 5B illustrate a process of performing, the image brightness adjusting method described with reference to FIG. 4.

Referring to FIGS. 4, 5A, and 5B, in operation 210, as described with reference to FIG. 2, an image receiver of an image brightness adjusting apparatus receives the input image 301. In operation 220, as described with reference to FIG. 2, a processor of the image brightness adjusting apparatus extracts one or more feature points 302 of an object in the input image 301. In operation 110, as described with reference to FIG. 1, the processor matches the object model 201 to the object. In operation 120, the processor maps a surface normal map 501 to the input image 301. In contrast to the surface normal map 303 illustrated in FIG. 3, the surface normal map 501 illustrated in FIG. 5A is obtained from the surface normal model 401 by transforming the surface normal model 401 into the surface normal map 501. In operation 130, similar to the description provided with reference to FIG. 1, the processor generates shadow information 304 based on the surface normal map 501 and a virtual light source. In operation 240, as described with reference to FIG. 2, the processor adjusts a tone of the input image 301. The details described with reference to FIGS. 2 and 3 are also applicable to operations 210, 220, 110, 130, and 240 in the example of FIGS. 4, 5A, and 5B, and thus a more detailed description has been omitted here to avoid repetition. However, operation 120 in the example of FIG. 4 will be described in detail with reference to operation 430 in the example of FIG. 4.

In one example, in operation 430, the processor generates the surface normal map 501 by transforming the surface normal model 401 of FIG. 5A prestored in a database in association with the object model 201. For example, the processor transforms the surface normal model 401 by matching each feature point of the surface normal model 401 to a feature point of the object model 201 matched to the object in operation 110. In operation 430, the processor generates the surface normal map 501 in a 2D image form as illustrated in FIG. 5A by transforming each coordinate of the prestored surface normal model 401 using a transformation function determined in operation 110. The surface normal map 501 is aligned based on a location of the object in the input image 301.

The surface normal model 401 is a model in which a corresponding normal vector is mapped to each coordinate of a 2D image. In one example, the surface normal model 401 is a model in a 2D image form that is prestored in association with the object model 201. As illustrated in FIG. 5A, the surface normal model 401 may be a model in which a normal vector is allocated to coordinates of each pixel in a general form of an object of a certain type, or is allocated to preassigned feature points.

In another example, as illustrated in FIG. 5B, a plurality of surface normal models corresponding to views of the object from different directions, for example, a surface normal model 401 corresponding to a front-side view of the object, a surface normal model 402 corresponding to a lower-side view of the object, a surface normal model 403 corresponding to an upper-side view of the object, and a surface normal model 404 corresponding to a right-side view of the object, are prestored. In such an example, in operation 430, the processor generates the surface normal map 501 by combining results of matching each of the surface normal models 401 through 404 to feature points of the object model 201 matched to the object. In one example, the processor calculates a similarity between the feature points of the object model 201 matched to the object and feature points of each of the surface normal models 401 through 404, and combines the results of matching each of the surface normal models 401 through 404 to the feature points of the object model 201 based on a ratio of the calculated similarities to generate the surface normal map 501.

For example, a ratio of similarities between the feature points of the object model 201 matched to the object and feature points of each of the surface normal model 401 corresponding to a front-side view of the object, the surface normal model 402 corresponding to a lower-side view of the object, the surface normal model 403 corresponding to an upper-side view of the object, and the surface normal model 404 corresponding to a right-side view of the object is calculated to be a:b:c:d, where a, b, c, and d are real numbers between 0 and 1, and a sum of the values of a, b, c, and d is 1. The processor assigns a weight of a to a result of matching the surface normal model 401 to the feature points of the object model 201 matched to the object, a weight of b to a result of matching the surface normal model 402 to the feature points of the object model 201 matched to the object, a weight of c to a result of matching the surface normal model 403 to the feature points of the object model 201 matched to the object, and a weight of d to a result of matching the surface normal model 404 to the feature points of the object model 201 matched to the object, and adds the weights together to generate the surface normal map 501.

Although surface normal models corresponding to views of the object from four different directions, that is, the surface normal models 401 through 404, are illustrated in FIG. 5B, surface normal models corresponding to views of the object from various other directions may be prestored and used to generate the surface normal map 501. In addition, the processor may generate a surface normal model corresponding to a left-side view of the object by reversing the surface normal model 404 corresponding to a right-side view of the object.

Figure 6A:
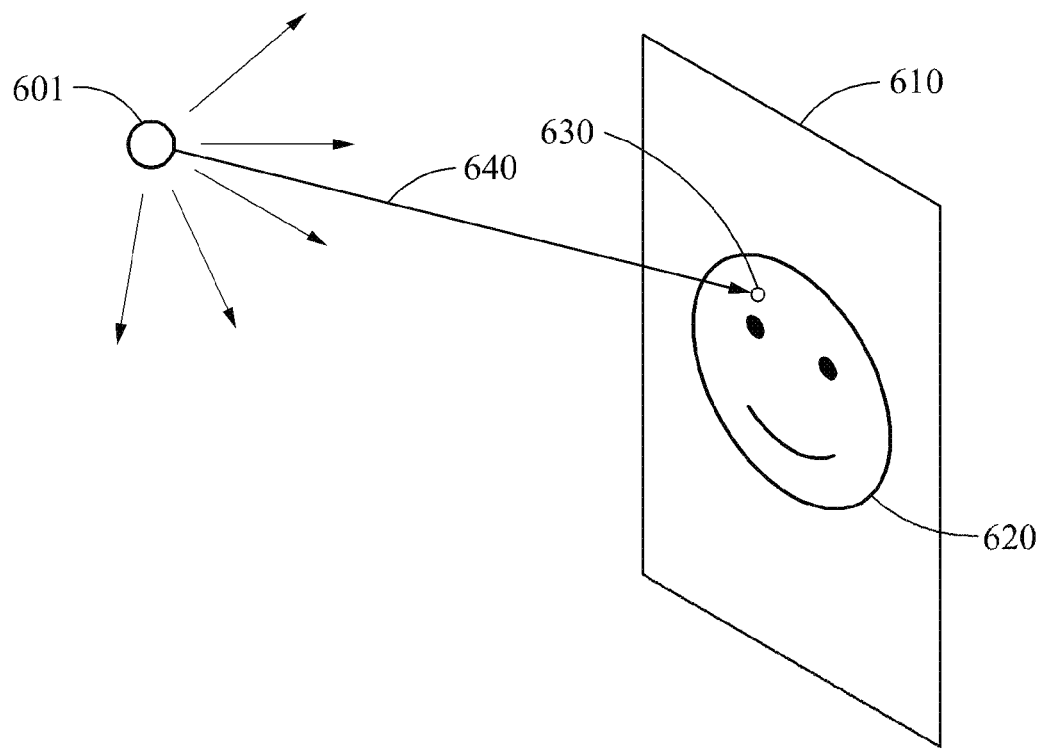
FIGS. 6A and 6B are diagrams illustrating examples of a light vector based on a type of a light source.
Figure 6B:
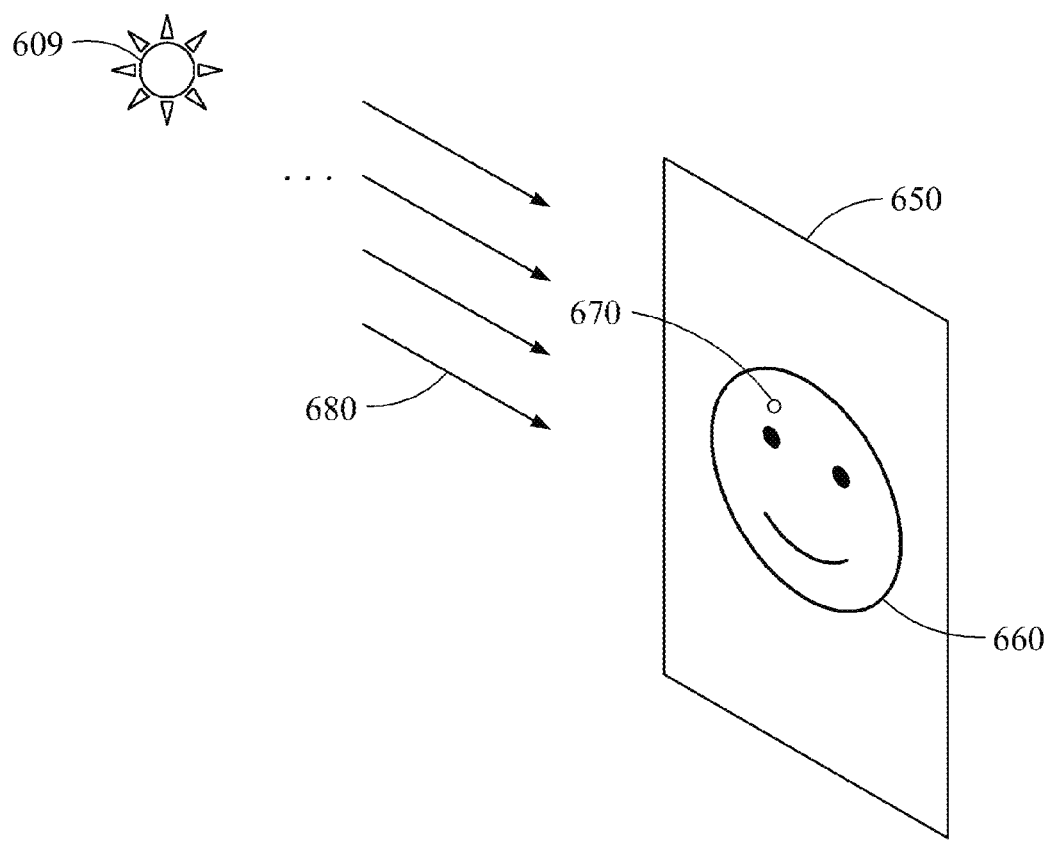

FIGS. 6A and 6B are diagrams illustrating examples of a light vector based on a type of a light source.

A type of a virtual light source used to adjust a brightness of an image may be set by a user or set automatically. The virtual light source is a light source set to affect an input image with an illumination effect. For example, a spot light source or a directional light source may be used as the virtual light source. However, a type of the virtual light source is not limited thereto.

The spot light source is a virtual light source that radiates light in all directions from the virtual light source set at a preset location. The directional light source is a virtual light source that radiates light in a preset direction. For example, in a case of a light source located at a great distance from the object, for example, the sun, light having substantially the same direction arrives at the object.

A light vector indicates a direction and a magnitude of light radiated from the virtual light source. The light vector indicates a degree and a direction of a light source effect by the virtual light source. Hereinafter, a light vector having a normalized magnitude will be described, but the light vector is not limited thereto.

For the spot light source, a processor determines a light vector incident onto a pixel of the input image based on a relationship between a location of the virtual light source and a location of the pixel. Thus, the light vector produced by the spot light source varies depending on a location of the spot light source. The light vector produced by the spot light source will be described later with reference to FIG. 6A.

For the directional light source, the processor determines a light vector incident onto a pixel of the input image based on an illumination direction of the virtual light source. Thus, the light vector produced by the directional light source is determined to be a preset vector value. The light vector produced by the directional light source will be described later with reference to FIG. 6B.

FIG. 6A is a diagram illustrating an example of a light vector 640 produced by a spot light source 601.

Referring to FIG. 6A, light radiated from the spot light source 601 is projected onto a pixel 630 of an object 620 in an input image 610. Location information of the spot light source 601, for example, coordinates of the spot light source 601, may be set by a user or set automatically. The light vector 640 produced by the spot light source 601 may be calculated using only the location information of the spot light source 601 and the pixel 630. For example, the light projected from the spot light source 601 onto the pixel 630 is indicated as the light vector 640, and the light vector 640 is defined as a normalized location difference between the spot light source 601 and the pixel 630. For example, when the location of the spot light source 601 is $(S_x, S_y, S_z)$, which is, for example, set by the user or set automatically, and the location of the pixel 630 in the input image 610 is $(x, y, 0)$, where z coordinates of all pixels in the input image 610 are assumed to be 0, the processor defines the light vector 640 projected onto the pixel 630 to be, for example, $L=[x-S_x, y-S_y, -S_z]$, and calculates the light vector 640 to have a normalized value. For example, the light vector 640 may be normalized by dividing $x-S_x$, $y-S_y$, and $-S_z$ by the length of the light vector 640.

For example, when a value of a normal vector in a surface normal map at a location $(x, y)$ in the input image 610 is $(w_{xy}, u_{xy}, v_{xy})$, the processor calculates a value resulting from a dot product calculation between the light vector L produced by the spot light source 601 and the normal vector at the location $(x, y)$ to be $w_{xy}(x-S_x)+u_{xy}(y-S_y)+v_{xy}(-S_z)$ using the normalized values of $x-S_x$, $y-S_y$, and $-S_z$.

FIG. 6B is a diagram illustrating an example of a light vector 680 produced by a directional light source 609.

In the example of FIG. 6B, the directional light source 609 is assumed to be located at a great distance from an input image 650, and thus light from a same direction is projected from the directional light source 609 onto all pixels including a pixel 670 of an object 660 in the input image 650. A direction of the directional light source 609 may be set by a user or set automatically. Since the directional light source 609 is assumed to be located at a great distance from the object 660 in the input image 650, all of the light vectors projected onto all of the pixels including, for example, the pixel 670, of the object 660 are equal once a direction in which light produced by the directional light source 609 is projected is set. For example, the light vector 680 projected by the directional light source 609 onto each pixel including, for example, the pixel 670, is defined to be $L=[L_x, L_y, L_z]$, where $L_x$, $L_y$, and $L_z$ denote a direction of the light in an x-axis direction, a direction of the light in a y-axis direction, and a direction of the light in a z-axis direction, respectively. L may be normalized to have a value of 1 or some other value.

For example, when a value of a normal vector in a surface normal map at a location $(x, y)$ in the input image 650 is $(w_{xy}, u_{xy}, v_{xy})$, the processor calculates a value resulting from a dot product calculation between a light vector L produced by the directional light source 609 at the location $(x, y)$ and the normal vector to be $w_{xy}L_x+u_{xy}L_y+v_{xy}L_z$.

Although in the examples of FIGS. 6A and 6B, the processor generates shadow information based on a dot product calculation between a light vector and a normal vector, the generating of the shadow information is not limited thereto. Hereinafter, another example of generating shadow information will be described with reference to FIG. 7.

Figure 7:
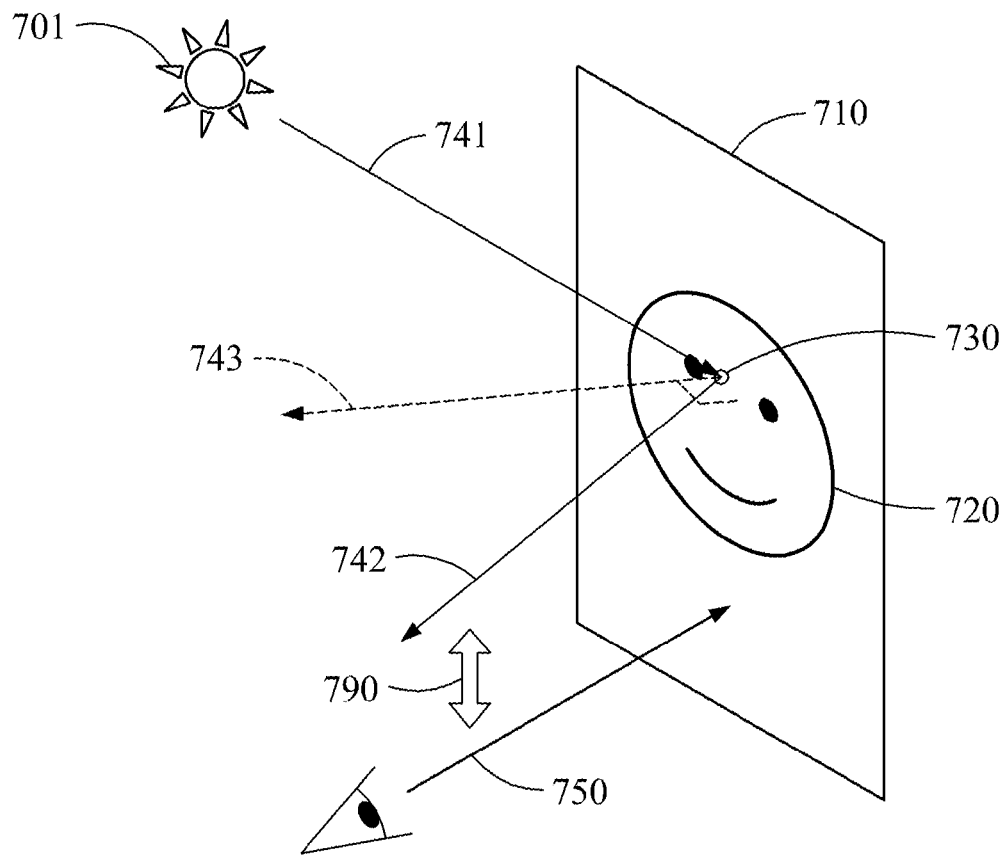
FIG. 7 is a diagram illustrating an example of a process of generating shadow information based on a view vector and a reflection vector.

FIG. 7 is a diagram illustrating an example of a process of generating shadow information based on a view vector 750 and a reflection vector 742.

The view vector 750 is a vector indicating a direction in which a user views an input image 710 or an object 720. The reflection vector 742 is a vector indicating light reflected after being projected from a light source 701 onto a pixel 730 of the object 720. Thus, the reflection vector 742 is a vector reflected from a light vector 741 by the object 720. In one example, a processor calculates the reflection vector 742 to be $L-2(L\cdot\hat{n})\hat{n}$, where L denotes the light vector 741, and $\hat{n}$ denotes a normal vector 743 obtained from the surface normal map.

In one example, the processor generates the shadow information by performing a dot product calculation 790 between the view vector 750 and the reflection vector 742. For example, in a general case in which the user observes a device from directly in front of the device, the view vector 750 is $(0, 0, 1)$, and thus the processor selects only a z direction component of the reflection vector 742 use in generating the shadow information.

In one example, the process of generating the shadow information based on the view vector 750 and the reflection vector 742 described above with reference to FIG. 7 is applicable to both the spot light source 601 illustrated in FIG. 6A and the directional light source 609 illustrated in FIG. 6B. For example, in a case in which light is set to be radiated in a preset direction and the light is radiated in such a preset direction as in the directional light source 609 illustrated in FIG. 6B, shadow information generated based on the view vector 750 becomes brighter the more closely the view vector 750 aligns with the reflection vector 742.

Figure 8:
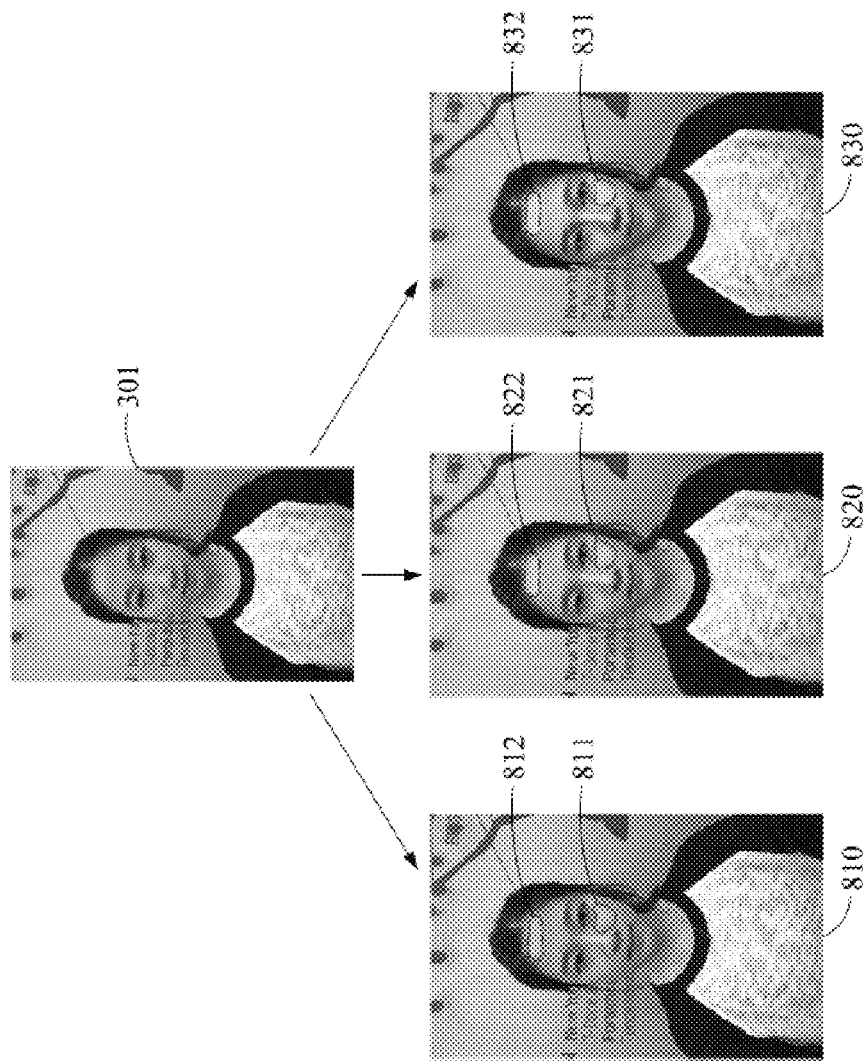
FIG. 8 illustrates an example of an image relighted based on an intensity of a light source.

FIG. 8 illustrates an example of an image relighted based on an intensity of a light source.

FIG. 8 illustrates an image 810, an image 820, and an image 830 that are relighted from an input image 301, that is, images in which a brightness is adjusted from the input image 301 based on the method described with reference to FIGS. 1 through 5B.

The relighted images 810, 820, and 830 are example images that are obtained when an intensity of a virtual light source is set at different levels. The relighted image 810 is an image when the intensity of the virtual light source is set at a low level, the relighted image 820 is an image when the intensity of the virtual light source is set at an intermediate level, and the relighted image 830 is an image when the intensity of the virtual light source is set at a high level.

As illustrated in FIG. 8, a brightness of partial regions 821 and 822 of the relighted image 820 are adjusted to be relatively higher than a brightness of partial regions 811 and 812 of the relighted image 810. Also, a brightness of partial regions 831 and 832 of the relighted image 830 are adjusted to be relatively higher than the brightness of the partial regions 821 and 822 of the relighted image 820.

Although a case of an increase in a brightness of a partial region in the input image 301 is described with reference to FIG. 8, an illumination effect by a virtual light source may affect an overall area of an object, and also the brightness of the partial region may decrease, which is, for example, a shadow effect.

Thus, an image brightness adjusting apparatus may naturally increase or decrease a brightness of an object in an input image based on an intensity of a virtual light source without disharmony.

Figure 9:
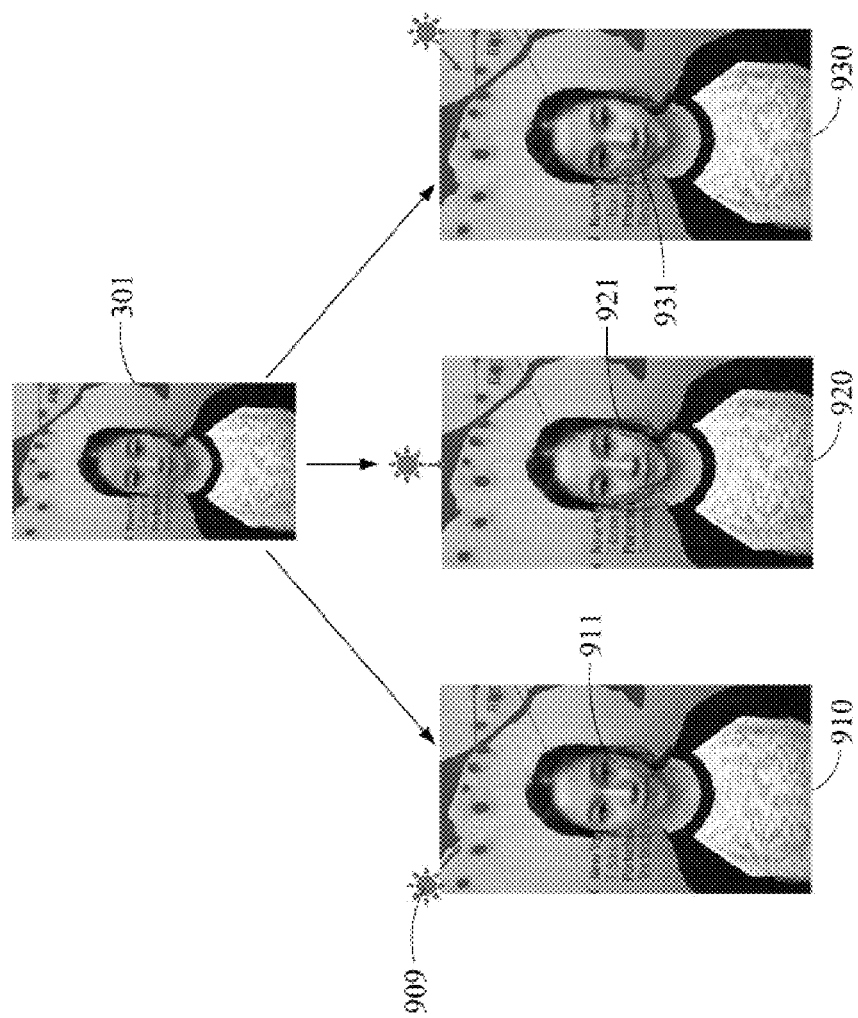
FIG. 9 illustrates an example of an image relighted based on a location of a light source.

FIG. 9 illustrates an example of an image relighted based on a location of a light source.

FIG. 9 illustrates an image 910, an image 920, and an image 930 that are relighted from an input image 301, that is, images in which a brightness is adjusted from the input image 301 based on the method described with reference to FIGS. 1 through 5B. In the example of FIG. 9, a virtual light source 909 is a directional light source.

The relighted images 910, 920, and 930 are example images that are obtained when a direction of the virtual light source 909 is set to different directions. The relighted image 910 is an image obtained when applying the virtual light source 909 set to project light towards an object in a −45°-angled direction from an upper left side of the object. The relighted image 920 is an image obtained when applying the virtual light source 909 set to project light towards the object in a 0°-angled direction from an upper front side of the object, and the relighted image 930 is an image obtained when applying the virtual light source 909 set to project light towards the object in a +45°-angled direction from an upper right side of the object.

As illustrated in FIG. 9, in the relighted image 910, a brightness of a lower right region 911 of the object in FIG. 9, which is a human face, is decreased due to the virtual light source 909 from which light is projected in the −45°-angled direction from the upper left side. In the relighted image 920, a brightness of a lower region 921 of the object is decreased due to the virtual light source 909 from which light is projected towards the object in a 0°-angled direction from the upper front side. In the relighted image 930, a brightness of a lower left region 931 of the object is decreased due to the virtual light source 909 from which light is projected towards the object in a +45°-angled direction from the upper right side. As illustrated in FIG. 9, a shadow effect is applied to the object by the virtual light source 909.

Although a case of a decrease in a brightness of a partial region in the input image 301, that is, a shadow effect, is described with reference to FIG. 9, an illumination effect by the virtual light source 909 may affect an overall area of an object, and also the brightness of the partial region may increase.

Thus, an image brightness adjusting apparatus may naturally increase or decrease a brightness of an object in an input image based on a location and a direction of a virtual light source without disharmony.

FIG. 10 illustrates an example of a graphical user interface (GUI) of an image brightness adjusting apparatus 1000.

The image brightness adjusting apparatus 1000 may be, for example, a smartphone, but is not limited thereto. The image brightness adjusting apparatus 1000 receives from a user a manipulation needed to perform the method described with reference to FIGS. 1 through 5B. For example, FIG. 10 illustrates an example of a GUI to receive from the user a manipulation for setting of a virtual light source.

Referring to FIG. 10, the GUI includes a light source type interface 1010, a light source location/direction interface 1020, and a light source intensity interface 1030. A type and a design of an interface are not limited to the example in FIG. 10, and thus various other interfaces may be used.

The light source type interface 1010 is set to receive from a user a manipulation to set a type of a virtual light source. For example, the image brightness adjusting apparatus 1000 receives from the user a manipulation to set a spot light source or a directional light source through the light source type interface 1010.

The light source location/direction interface 1020 is set to receive from the user a manipulation to set either one or both of a location and a direction of the virtual light source based on the set type of the virtual light source.

In a case of the spot light source being selected, the light source location/direction interface 1020 receives from the user a manipulation to set a location of the virtual light source. Since the spot light source projects light in all directions and a light vector produced by the spot light source may be derived for each pixel of an input image once a location of the spot light source is set, a light source effect produced by the light vector may be expressed through an interface setting only the location. The light vector produced by the spot light source with respect to a pixel may be calculated to be a location difference between coordinates of the pixel and coordinates of the spot light source. In one example, the processor provides the user with an interface (not shown) for a plurality of preset locations. When the processor receives from the user a selection of a location of the spot light source, the processor sets the selected location to be the location of the spot light source. For example, as illustrated in FIG. 10, when a middle icon of the light source location/direction interface 1020 is activated by the user, the image brightness adjusting apparatus 1000 sets the location of the virtual light source at a preset point in front of an object.

In a case of the directional light source being selected, the light source location/direction interface 1020 receives from the user a manipulation to set a direction of the virtual light source. Since the directional light source is assumed to project light having the same direction towards all pixels of an input image and a light vector produced by the directional light source may be derived for each pixel of the input image once a direction of the directional light source is set, a light source effect produced by the light vector may be expressed through an interface setting only the direction. In one example, the processor provides the user with an interface (not shown) to select one of a plurality of preset directions. When the processor receives from the user a selection of a direction of the directional light source, the processor sets the selected direction to be the direction of the directional light source. For example, when a right icon is activated by the user, the image brightness adjusting apparatus 1000 sets a direction of a light vector produced by the virtual light source to be towards the object from an upper right side of the object.

The light source intensity interface 1030 is set to receive from the user a manipulation to set an intensity of the virtual light source. For example, the intensity of the virtual light source may be classified in a range from a level 0, which is an OFF state of the virtual light source, through a level 5, which is a maximum intensity of the virtual light source. For example, as illustrated in FIG. 10, when an icon corresponding to a level 3 is activated by the user, the image brightness adjusting apparatus 1000 sets the intensity of the virtual light source to be the level 3, which is an intermediate intensity of the virtual light source. A classification of the intensity of the virtual light source is not limited to the foregoing example, and thus the intensity of the virtual light source may be classified into n levels, wherein n is an integer greater than or equal to 1.

A preview interface provides a relighted image 1009. In addition, the preview interface may provide a result of adjusting a tone of the relighted image 1009. In example, the preview interface provides the relighted image 1009 generated by applying in real time a manipulation received from the user through a light source setting interface, for example, the interfaces 1010 through 1030 illustrated in FIG. 10, and a tone adjusting interface (not shown). For example, when the intensity of the virtual light source is modified through the light source intensity interface 1030, the image brightness adjusting apparatus 1000 displays in real time the relighted image 1009 to which the modified intensity of the virtual light source is applied.

However, the GUI of the image brightness adjusting apparatus 1000 is not limited to the interfaces 1010 through 1030 illustrated in FIG. 10, and thus various other interfaces may be provided, such as an interface to adjust a tone of the relighted image 1009, for example, to perform operation 240 described with reference to FIGS. 2 and 4, an interface to capture an image, and an interface to store the relighted image 1009.

Figure 11:
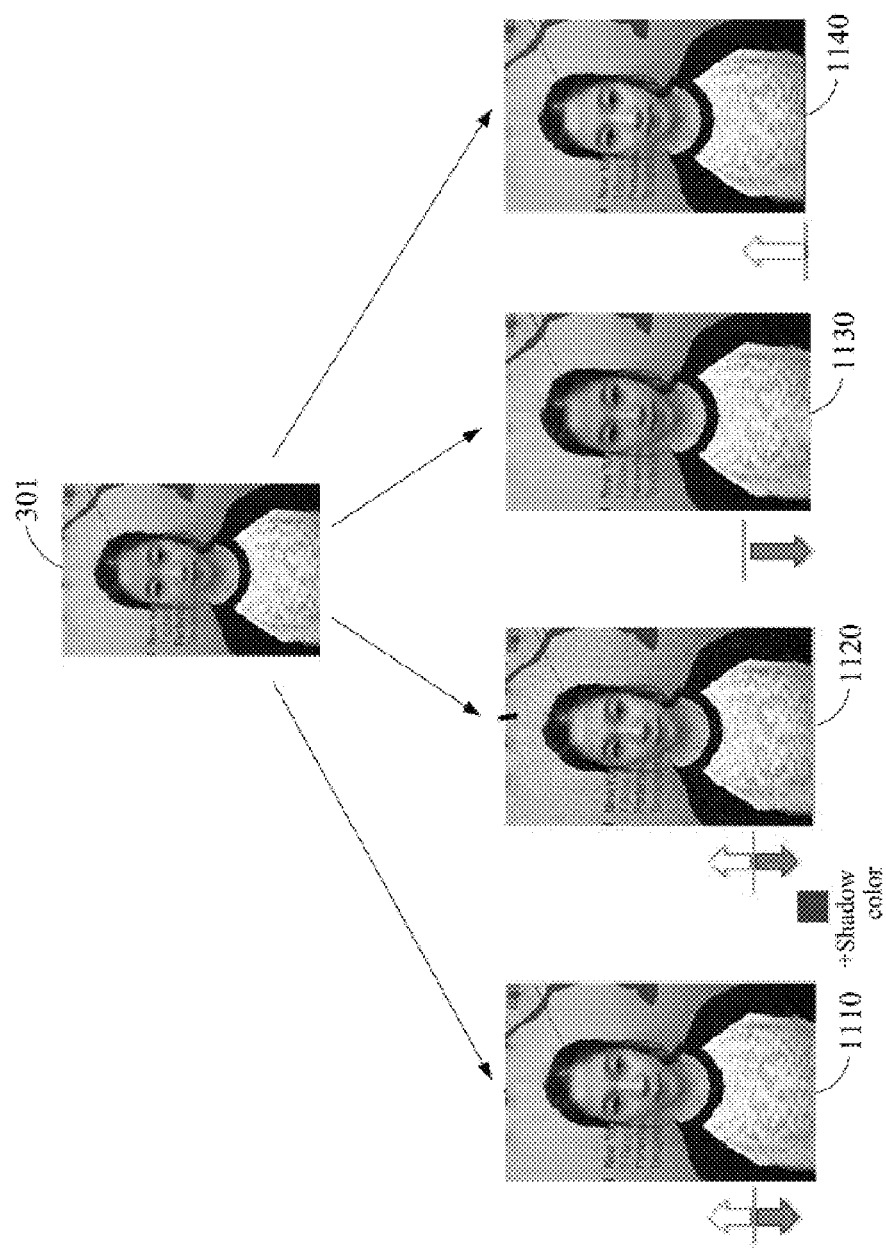
FIG. 11 illustrates an example of a relighted image in which a tone is adjusted.

FIG. 11 illustrates an example of a relighted image in which a tone is adjusted.

In one example, a processor of an image brightness adjusting apparatus applies shadow information to an input image 301 in operation 240 described with reference to FIGS. 2 through 5B, and adjusts a tone of the input image 301. For example, the processor generates a relighted image by applying the shadow information to the input image 301 and adjusts a tone of the relighted image. In FIG. 11, four tone adjusting styles are illustrated, but a tone adjusting style is not limited to the illustrated styles.

For example, a first style is a style of adding a weight to a tone of pixels in a bright area and a dark area in an image. Based on the first style, the processor adds the same weights to a tone of a pixel in the bright area and a tone of a pixel in the dark area. In such an example, since a degree by which the bright area is brightened by the weight and a degree by which the dark area is darkened by the weight are equal, an overall contrast of a relighted image 1110 in which a tone is adjusted based on the first style increases. The first style may also be referred to as a dark and bright style.

The pixel in the bright area is a pixel having a brightness that is greater than a threshold value, and the pixel in the dark area is a pixel having brightness that is less than or equal to the threshold value.

For example, a second style is a style of adding the same weights as in the first style, and further adding a shadow color to a pixel in the dark area. Since a shadow color set to be similar to a human skin tone, for example, brown, is further added to a relighted image 1120 in which a tone is adjusted based on the second style, a shadow effect may be expressed more naturally. The second style may also be referred to as a shadow coloring mixing style.

For example, a third style is a style of adding a weight to a tone of a pixel in the dark area while maintaining a tone of a pixel in the bright area. In a relighted image 1130 in which a tone is adjusted based on the third style, the dark area is emphasized compared to the bright area, and thus the third style may be more suitable when the input image 301 is captured brightly in general. The third style may also be referred to as a dark tone style.

For example, a fourth style is a style of adding a weight to a tone of a pixel in the bright area while maintaining a tone of a pixel in the dark area. In a relighted image 1140 in which a tone is adjusted based on the fourth style, the bright area is emphasized compared to the dark area, and thus the fourth style may be more suitable when the input image 301 is captured darkly in general. The fourth style may also be referred to as a bright tone style.

The foregoing tone adjusting styles may be selected by a manipulation received from a user through a GUI, or may be automatically selected. Hereinafter, an example of automatically selecting a tone adjusting style will be described with reference to FIGS. 12 through 15.

FIGS. 12 through 15 illustrate examples of a process of adjusting a tone based on a brightness histogram of an image.

Figure 12:
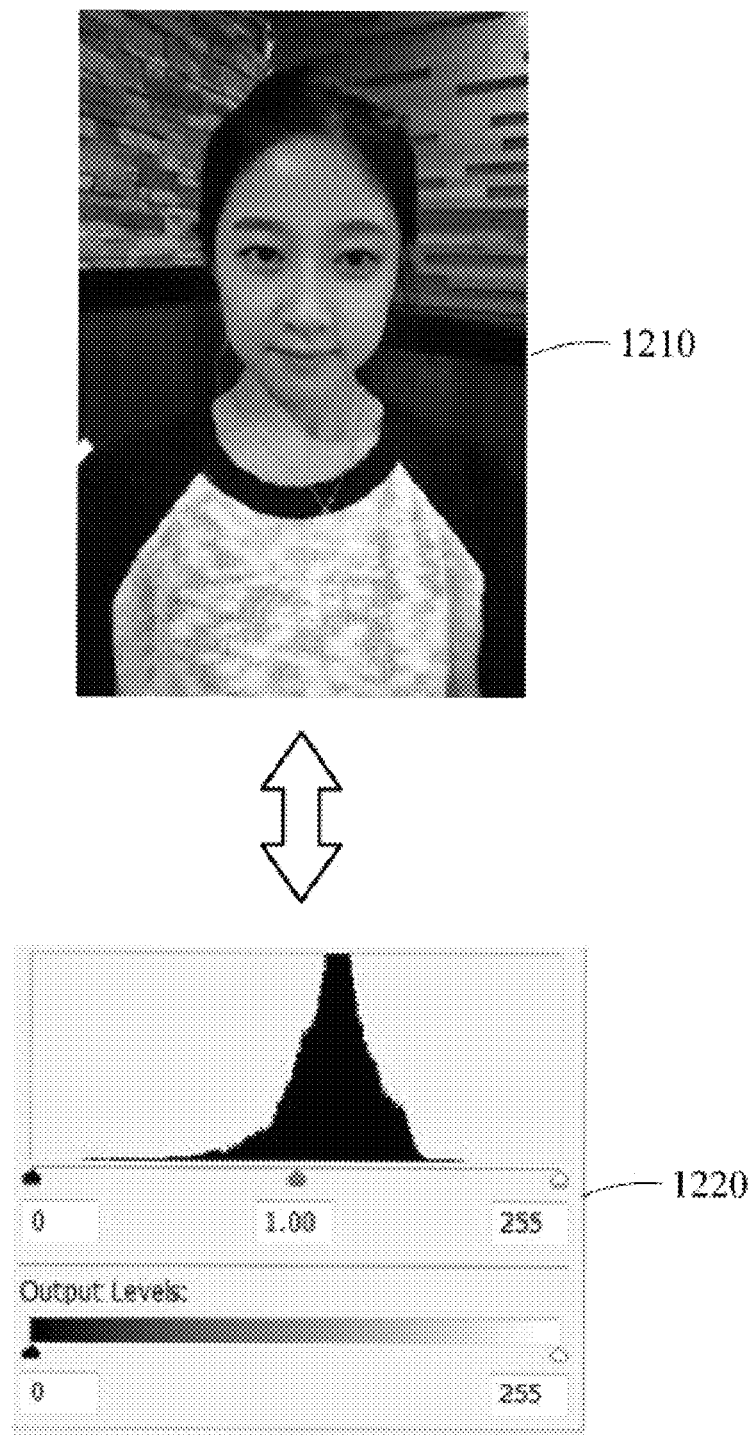
FIGS. 12 through 15 illustrate examples of a process of adjusting a tone based on a brightness histogram of an image.
Figure 13:
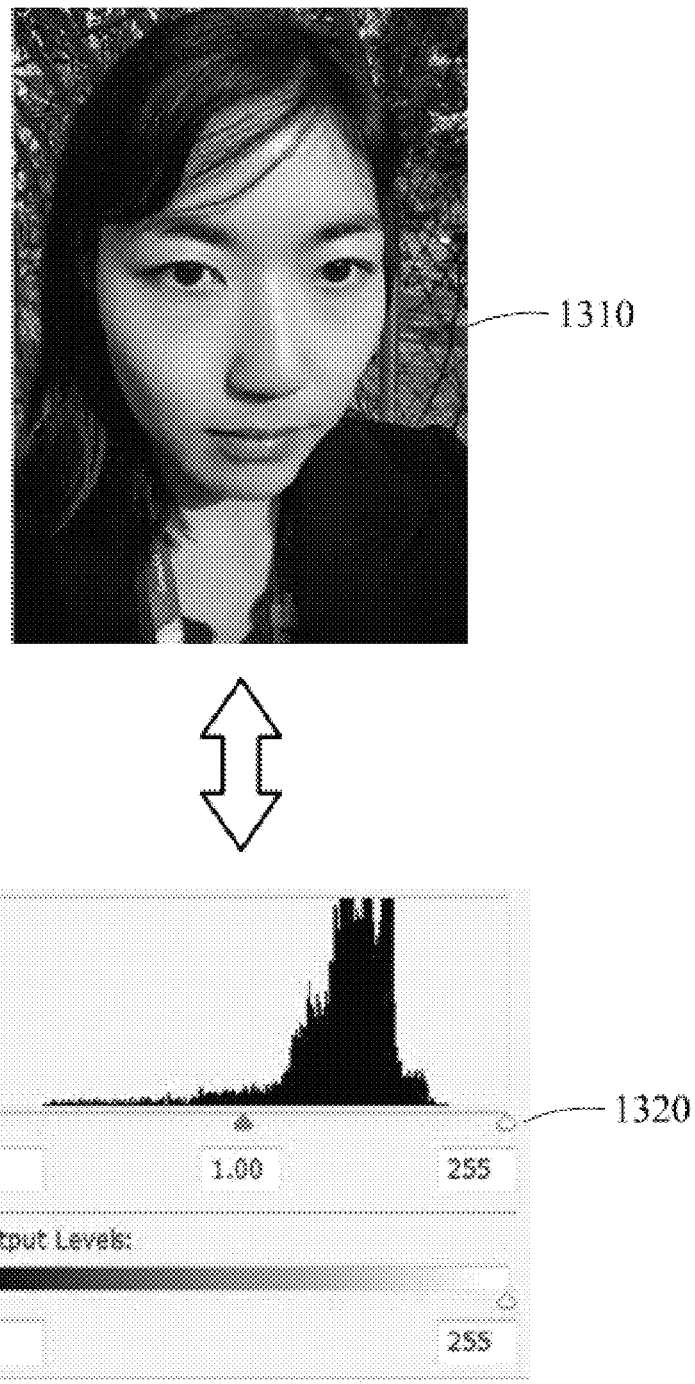
Figure 14:
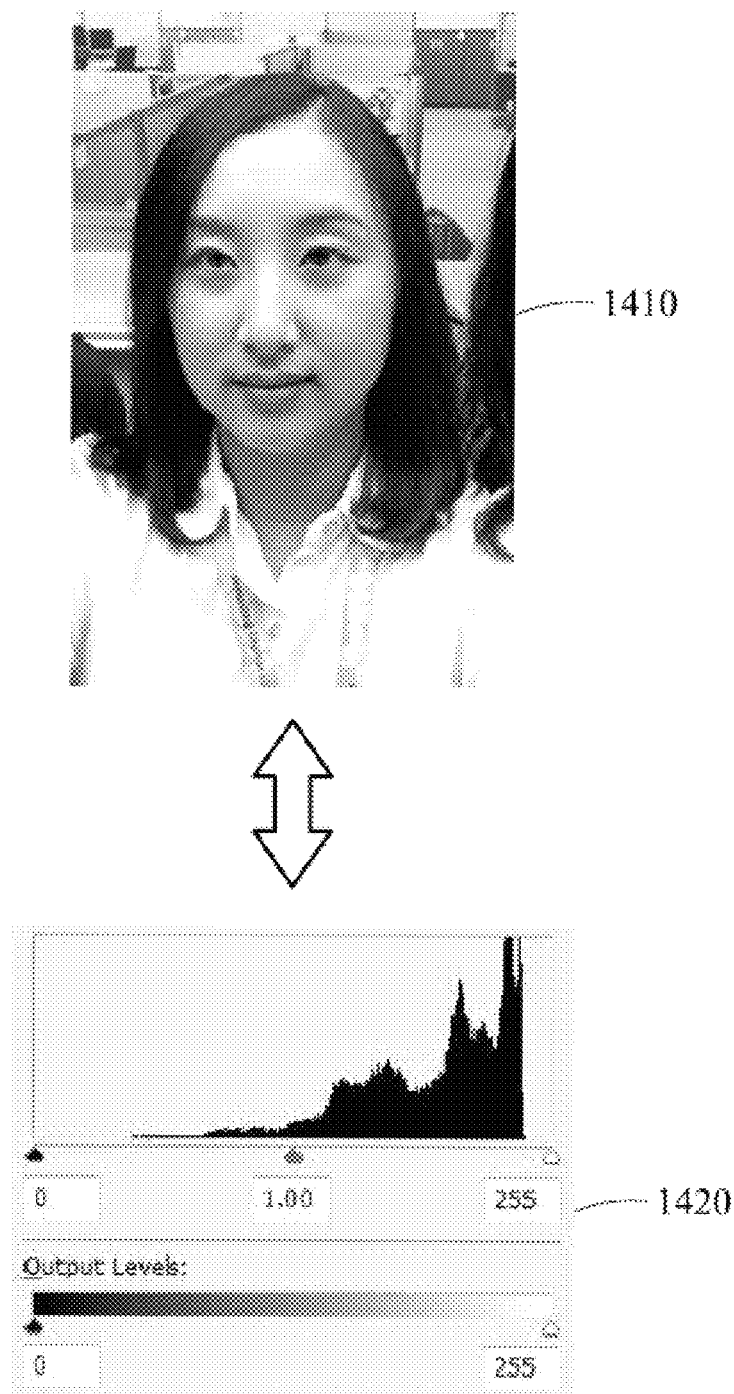
Figure 15:
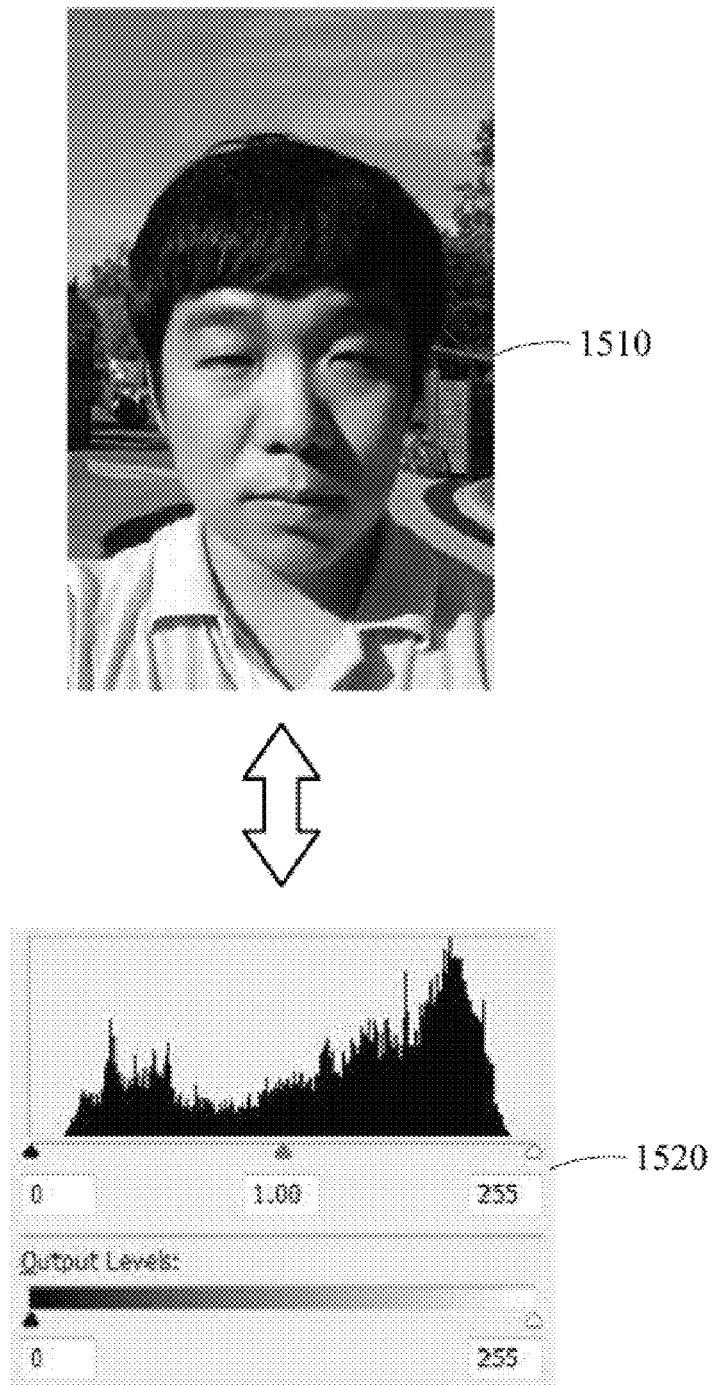

FIG. 12 illustrates an example of a relighted image 1210 in which a tone is adjusted based on the first style (the dark and bright style) described with reference to FIG. 11. FIG. 13 illustrates an example of a relighted image 1310 in which a tone is adjusted based on the second style (the shadow coloring mixing style) described with reference to FIG. 11. FIG. 14 illustrates an example of a relighted image 1410 in which a tone is adjusted based on the third style (the dark tone style) described with reference to FIG. 11. FIG. 15 illustrates an example of a relighted image 1510 in which a tone is adjusted based on the fourth style (the bright tone style) described with reference to FIG. 11.

Referring to FIGS. 12 through 15, a processor determines a tone adjusting style based on a brightness histogram of an input image, for example, a brightness histogram 1220 in FIG. 12, a brightness histogram 1320 in FIG. 13, a brightness histogram 1420 in FIG. 14, and a brightness histogram 1520 in FIG. 15, and adjusts a tone of each of the relighted images 1210, 1310, 1410, and 1510 based on the respective tone adjusting styles determined by the processor. For example, the processor adds a weight to a tone of a pixel in at least a portion of each of the relighted images 1210, 1310, 1410, and 1510 based on a ratio of a number of pixels in a preset brightness range in respective input images to a total number of pixels in the respective input images. The brightness histograms 1220, 1320, 1420, and 1520 illustrated in FIGS. 12 through 15 show a brightness distribution of pixels in the respective input images. In the brightness histograms, a horizontal axis indicates a brightness, and a vertical axis indicates the number of pixels in an input image having the brightness indicated by the horizontal axis. Although the brightness histograms 1220, 1320, 1420, and 1520 are related to the respective input images, a brightness histogram related to each of the relighted images 1210, 1310, 1410, and 1510 may be used.

In a first example, when a ratio of a number of pixels having a brightness greater than a first threshold brightness and less than or equal to a second threshold brightness in the input image to the total number of pixels in the input image is greater than or equal to a preset first ratio, the processor adds a weight to a dark area and a bright area in shadow information. For example, in a case of a brightness of an input image being at an intermediate level as shown in the brightness histogram 1220 in FIG. 12, the processor adjusts a tone of the input image based on the first style (the dark and bright style).

In a second example, when a ratio of a number of pixels having a brightness greater than the second threshold brightness and less than or equal to a third threshold brightness in the input image to the total number of pixels in the input image is greater than or equal to a preset second ratio, the processor adds a weight to the dark area and the bright area in the shadow information, and adds a preset shadow color to the dark area. For example, in a case of a brightness of an input image being at an upper intermediate level as shown in the brightness histogram 1320 in FIG. 13, the processor adjusts a tone of the input image based on the second style (the shadow coloring mixing style).

In a third example, when a ratio of a number of pixels having a brightness greater than the third threshold brightness in the input image to the total number of pixels in the input image is greater than or equal to a preset third ratio, the processor adds a weight to the dark area in the shadow information. For example, in a case of a brightness of an input image being at a high level as shown in the brightness histogram 1420 in FIG. 14, the processor adjusts a tone of the input image based on the third style (the dark tone style).

In a fourth example, when a ratio of the number of pixels having a brightness less than or equal to the first threshold brightness in the input image to the total number of pixels in the input image is greater than or equal to a preset fourth ratio, the processor adds a weight to the bright area in the shadow information. For example, in a case of a brightness of an input image being at a low level as shown in the brightness histogram 1520 in FIG. 15, the processor adjusts a tone of the input image based on the fourth style (the bright tone style).

Some or all of the first ratio, the second ratio, the third ratio, and the fourth ratio referred to in the preceding paragraphs may be the same as each other, or some or all of the first ratio, the second ratio, the third ratio, and the fourth ratio may be different from each other.

However, application of each tone adjusting style is not limited to the foregoing examples, and thus a standard for the application of each tone adjusting style may be modified based on, for example, a preference of a user, a situation of a background image, a manipulation by a user, and a design.

FIGS. 16 through 19 are diagrams illustrating examples of an image brightness adjusting apparatus 1600.

Figure 16:
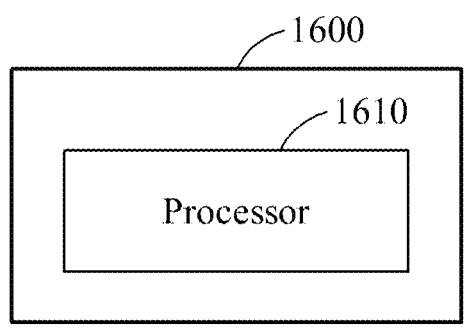
FIGS. 16 through 19 are diagrams illustrating examples of an apparatus for adjusting a brightness of an image.
Figure 17:
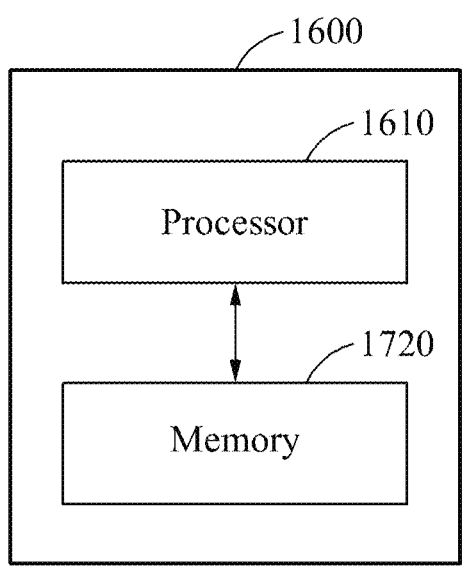
Figure 18:
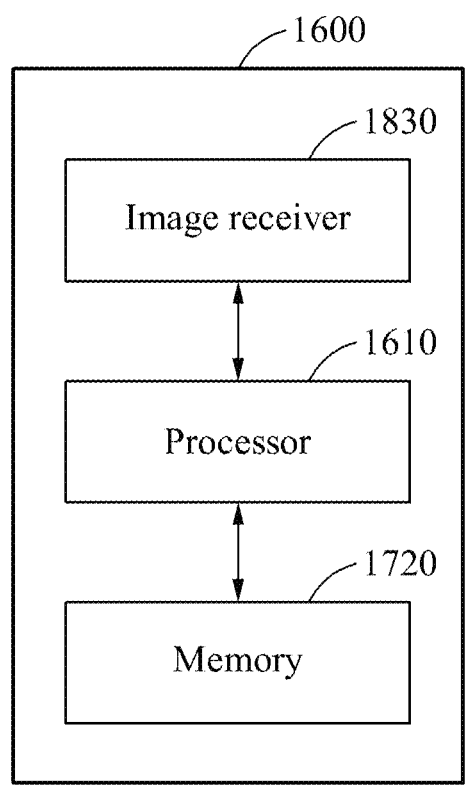
Figure 19:
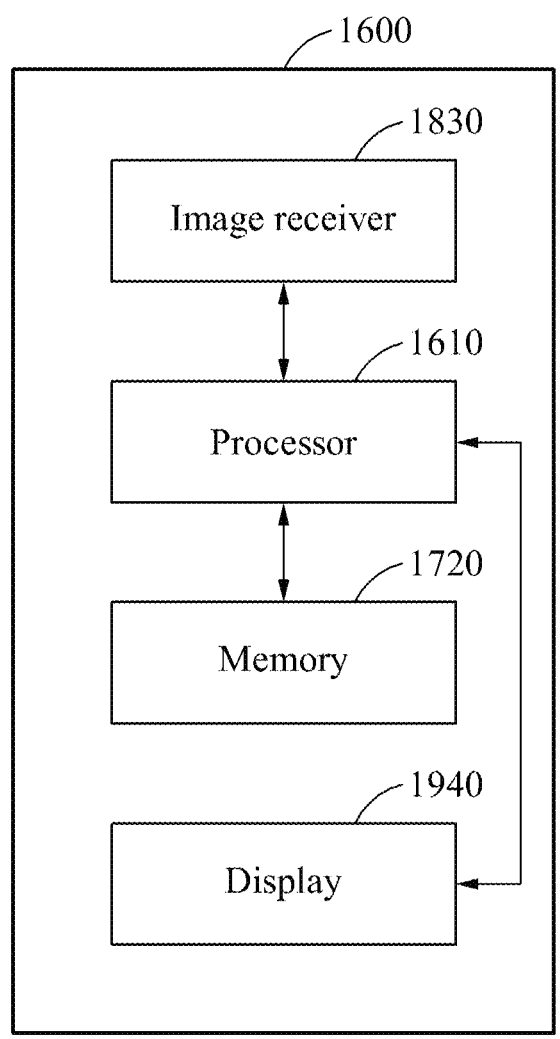

Referring to FIG. 16, the image brightness adjusting apparatus 1600 includes a processor 1610. Referring to FIGS. 17 through 19, the image brightness adjusting apparatus 1600 further includes a memory 1720, an image receiver 1830, and a display 1940.

The processor 1610 performs an image brightness adjusting method described with reference to FIGS. 1 through 5B. For example, the processor 1610 matches an object model to an object based on one or more feature points of the object extracted from an input image including the object, maps a surface normal map in a 2D image form to the input image based on the matched object model, and generates shadow information for the input image based on the mapped surface normal map and a virtual light source.

The memory 1720 is a non-transitory computer-readable storage medium and may store instructions that, when executed by the processor 1610, cause the processor 1610 to perform the image brightness adjusting method described with reference to FIGS. 1 through 5B. The memory 1720 may store in advance the object model and a surface normal model associated with the object model in a database. For example, the memory 1720 may store the input image, a relighted image, and a relighted image in which a tone is adjusted and also store data such as the shadow information and the surface normal map that is needed or generated in performing the image brightness adjusting method described with reference to FIGS. 1 through 5.

The image receiver 1830 receives the input image from an external source. For example, the image receiver 1830 may receive the input image captured through a camera. Alternatively, the image receiver 1830 may receive the input image from an external source through wired or wireless communication.

The display 1940 displays an image. In one example, the display 1940 applies the shadow information to the input image. For example, the display 1940 may display the input image, the relighted image, and the relighted image in which a tone is adjusted. Although a still image has been used as an example image herein, the examples described herein are not limited thereto, and thus the image brightness adjusting apparatus 1600 is also applicable to a video. In a case of an image being a video, the processor 1610 performs in real time the method described with reference to FIGS. 1 through 15 for each frame of the video and applies a natural shadow effect to an object appearing in each frame. The display 1940 may be, for example, a screen, a projector, a liquid crystal display (LCD), an organic light-emitting diode (OLED) display, or any other type of display known to one of ordinary skill in the art.

The image brightness adjusting apparatus 1600 may be an electronic device including the processor 1610 configured to process an image according to the method described with reference to FIGS. 1 through 15, for example, a smartphone or a camera.

The image brightness adjusting apparatus 1600 may apply low-complexity graphic rendering technology, for example, an illumination (or lighting) effect by a light source and soft shading, to a face captured through a camera, and thus may additionally express a natural shadow effect. Performance may be restricted in a mobile smart device such as a smartphone or a camera. However, implementing the image brightness adjusting apparatus 1600 in the mobile smart device prevents a degradation in performance while applying in real time a natural shadow effect to an input image in the mobile smart device. For example, the image brightness adjusting apparatus 1600 may apply in real time a shadow effect produced by a virtual light source to an object without a complex physical operation or calculation associated with illumination by using a central processing unit (CPU), a graphics processing unit (GPU), and a standard graphics software (SW) embedded in the mobile smart device to perform the method described with reference to FIGS. 1 through 15.

In addition, in a case in which a human face is captured from a front side, for example, in a case of a selfie image, the image brightness adjusting apparatus 1600 may apply a shadow effect more naturally. When capturing an image, for example, when storing the captured image after a preview, the image brightness adjusting apparatus 1600 may overlay, in real time, a face region with the shadow effect produced by a virtual light source and easily edit the captured image through the method described herein.

The image brightness adjusting apparatus 1600 produces a high-quality shadow effect while using a simple geometric model, for example, an object model, without using a complex 3D geometric model. In addition, the image brightness adjusting apparatus 1600 produces in real time a detailed shadow effect without performing a complex calculation by simplifying an illumination calculation by performing a dot product calculation between a light vector and a surface normal map.

Further, the image brightness adjusting apparatus 1600 may manually or automatically select a tone adjusting style based on an image capturing situation when applying a shadow effect, and thus produces a more natural shadow effect. The image brightness adjusting apparatus 1600 produces an image in which features of a face are more naturally and clearly relighted, compared to simply performing filtering of a captured image.

The image brightness adjusting apparatuses 1000 and 1600, the processor 1610, the memory 1720, the image receiver 1830, and the display 1940 illustrated in FIGS. 10 and 16 through 19 that perform the operations described herein with respect to FIGS. 1 through 19 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1 through 19. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5B that perform the operations described herein with respect to FIGS. 1-19 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of adjusting a brightness of an image, the method comprising:
   matching an object model to an object based on one or more feature points of the object extracted from an input image comprising the object;
   generating a surface normal map by combining at least two of surface normal models corresponding to different views, the combining being based on results of matching feature points of each of the at least two of the surface normal models to feature points of the matched object model; and
   generating shadow information for the input image based on the surface normal map and a virtual light source.

2. The method of claim 1, wherein the generating of the shadow information comprises performing a dot product calculation between a normal vector at each coordinate of the surface normal map and a light vector of the virtual light source at a corresponding coordinate of the input image; and
the performing of the dot product calculation comprises determining the light vector at the corresponding coordinate of the input image based on either a relationship between a location of the virtual light source and the corresponding coordinate of the input image, or an illumination direction of the virtual light source.

3. The method of claim 1, further comprising:
generating a relighted image by applying the shadow information to the input image; and
adjusting a tone of the relighted image based on a brightness histogram of the input image;
wherein the adjusting of the tone of the relighted image comprises adding a weight to a tone of a pixel in at least a portion of the relighted image based on a ratio of a number of pixels in a preset brightness range in the input image to a total number of pixels in the input image.

4. The method of claim 1, further comprising receiving a control signal indicating any one or any combination of an intensity, a location, a color, an illumination direction, and a type of the virtual light source;
wherein the object is a human face.

5. A non-transitory computer-readable medium storing instructions that, when executed by a processor, cause the processor to perform the method of claim 1.

6. The method of claim 1, wherein the method is performed in a smartphone comprising a screen, and further comprises:
displaying on the screen a graphical user interface configured to enable a user of the smartphone to set an intensity of the virtual light source and either a location of the virtual light source or an illumination direction of the virtual light source; and
setting the intensity of the virtual light source and either the location of the virtual light source or the illumination direction of the virtual light source in response to manipulation of the graphical user interface by the user.

7. An apparatus for adjusting a brightness of an image, the apparatus comprising:
a processor configured to:
match an object model to an object based on one or more feature points of the object extracted from an input image comprising the object,
generate a surface normal map by combining at least two of surface normal models corresponding to different views, the combining being based on results of matching feature points of each of the at least two of the surface normal models to feature points of the matched object model, and
generate shadow information for the input image based on the surface normal map and a virtual light source.

8. The apparatus of claim 7, wherein the processor is further configured to:
perform a dot product calculation between a normal vector at each coordinate of the surface normal map and a light vector of the virtual light source at a corresponding coordinate of the input image, and
determine the light vector at the corresponding coordinate of the input image based on either a relationship between a location of the virtual light source and the corresponding coordinate of the input image, or an illumination direction of the virtual light source.

9. The apparatus of claim 7, wherein the processor is further configured to:
generate a relighted image by applying the shadow information to the input image, and adjust a tone of the relighted image based on a brightness histogram of the input image, and
add a weight to a tone of a pixel in at least a portion of the relighted image based on a ratio of a number of pixels in a preset brightness range in the input image to a total number of pixels in the input image.

10. The apparatus of claim 7, wherein the apparatus is a smartphone comprising a screen; and
the processor is further configured to display on the screen a graphical user interface configured to enable a user of the smartphone to set an intensity of the virtual light source and either a location of the virtual light source or an illumination direction of the virtual light source.

11. An apparatus comprising:
an image receiver configured to receive an input image comprising an object; and
a processor configured to:
match an object model to the object based on one or more feature points of the object extracted from the input image,
generate a surface normal map by combining at least two of surface normal models corresponding to different views, the combining being based on results of matching feature points of each of the at least two of the surface normal models to feature points of the matched object model, and
generate shadow information for the input image based on the surface normal map and a virtual light source.

12. The apparatus of claim 11, wherein the image receiver is a camera;
the processor is further configured to apply the shadow information to the input image; and
the apparatus further comprises a display configured to display the input image to which the shadow information is applied.

13. The apparatus of claim 11, wherein the processor is further configured to generate the shadow information based on a view vector indicating a direction in which a user views the object and a reflection vector indicating a direction in which light projected from the virtual light source onto the object is reflected by the object.

14. The apparatus of claim 11, wherein the apparatus is a camera configured to capture the input image and comprising a screen, or a communicator configured to receive the input image from an external source through wired or wireless communication and comprising a screen; and
the processor is further configured to display on the screen a graphical user interface configured to enable a user of the camera or communicator to set an intensity of the virtual light source and either a location of the virtual light source or an illumination direction of the virtual light source.

15. A method of adjusting a brightness of an image, the method comprising:
generating a surface normal map for an object in an input image by combining at least two of surface normal models corresponding to different views, the combining being based on results of matching feature points of each of the at least two of the surface normal models to feature points of an object model matched to the object;
generating shadow information for the input image based on the surface normal map and a virtual light source; and applying the shadow information to the input image to adjust a brightness of the input image.

16. The method of claim 15, further comprising matching the object model to the object based on feature points of the object and the feature points of the object model.

17. The method of claim 15, wherein the generating of the shadow information comprises calculating, as the shadow information, a dot product between a normal vector at each coordinate of the surface normal map and a light vector of the virtual light source at a corresponding coordinate of the input image.

18. The method of claim 15, wherein the generating of the shadow information comprises:
    calculating a reflection vector based on the surface normal map and the virtual light source; and
    calculating, as the shadow information, a dot product between a view vector indicating a direction in which a user views the object and the reflection vector at each coordinate of the input image indicating a direction in which light projected from the virtual light source onto the object is reflected by the object.

19. The method of claim 15, wherein the applying of the shadow information to the input image generates a relighted image; and
the method further comprises adjusting a tone of the relighted image based on a brightness histogram of the input image.

20. The method of claim 19, wherein the adjusting of the tone of the relighted image comprises:
    selecting a tone adjusting style from a plurality of tone adjusting styles based on the brightness histogram of the input image; and
    applying the selected tone adjusting style to the relighted image to adjust the tone of the relighted image.

21. The method of claim 15, wherein the method is performed in a smartphone comprising a screen, and further comprises:
    displaying on the screen a graphical user interface configured to enable a user of the smartphone to set an intensity of the virtual light source and either a location of the virtual light source or an illumination direction of the virtual light source; and
    setting the intensity of the virtual light source and either the location of the virtual light source or the illumination direction of the virtual light source in response to manipulation of the graphical user interface by the user.

* * * * *